(12) United States Patent
Wei

(10) Patent No.: US 7,261,966 B2
(45) Date of Patent: Aug. 28, 2007

(54) APPARATUS AND METHOD FOR CONDUCTING FLUID IN A FUEL CELL AND FUEL CELL EMPLOYING SAME

(75) Inventor: Jim Wei, Delta (CA)

(73) Assignee: Zongshen Pem Power Systems Inc., Richmond, BC (CA)

( * ) Notice: Subject to any disclaimer, the term of this patent is extended or adjusted under 35 U.S.C. 154(b) by 544 days.

(21) Appl. No.: 10/608,535

(22) Filed: Jun. 30, 2003

(65) Prior Publication Data

US 2004/0265672 A1     Dec. 30, 2004

(51) Int. Cl.
*H01M 8/02*     (2006.01)
(52) U.S. Cl. .......................................... 429/38; 429/39
(58) Field of Classification Search .................. 429/38, 429/39
See application file for complete search history.

(56) References Cited

U.S. PATENT DOCUMENTS

| | | | | |
|---|---|---|---|---|
| 3,134,697 A | 5/1964 | Niedrach | ..................... | 136/86 |
| 3,575,719 A | 10/1968 | Nelson et al. | .................. | 136/86 |
| 4,175,165 A | 11/1979 | Adlhart | ........................ | 429/30 |
| 4,478,917 A | 10/1984 | Fujita et al. | .................... | 429/33 |
| 4,515,871 A | 5/1985 | Shirogami et al. | ............ | 429/34 |
| 4,537,840 A | 8/1985 | Tsukui et al. | .................. | 429/33 |
| 4,769,297 A | 9/1988 | Reiser et al. | ................... | 429/17 |
| 5,108,849 A | 4/1992 | Watkins et al. | ................ | 429/30 |
| 5,366,818 A | 11/1994 | Wilkinson et al. | ............ | 429/13 |
| 5,484,666 A | 1/1996 | Gibb et al. | ..................... | 429/34 |
| 5,514,487 A | 5/1996 | Washington et al. | .......... | 429/39 |
| 5,858,569 A | 1/1999 | Meacher et al. | ............... | 429/26 |
| 5,879,826 A | 3/1999 | Lehman et al. | ................ | 429/13 |
| 6,686,082 B2 * | 2/2004 | Leger et al. | .............. | 429/38 X |
| 6,699,614 B2 * | 3/2004 | Rock | ............................ | 429/39 |
| 2001/0050230 A1 | 12/2001 | Surampudi et al. | ......... | 204/422 |

FOREIGN PATENT DOCUMENTS

| | | |
|---|---|---|
| EP | 0 924 785 A2 | 6/1999 |
| GB | 2 372 626 A | 8/2002 |
| JP | 61256568 | 11/1986 |

* cited by examiner

*Primary Examiner*—Stephen J. Kalafut

(57) ABSTRACT

An apparatus for conducting fluid in a fuel cell. The apparatus includes a unitary gas-impermeable body having, a face having a recessed surface and a wall extending around the recessed surface, the recessed surface and the wall defining a fluid dispersion area. The apparatus further includes a plurality of spaced apart protrusions protruding from the recessed surface in the fluid dispersion area such that portions of the recessed surface extend all around each of the protrusions, each protrusion having a protrusion surface spaced apart from the recessed surface. The apparatus further includes an inlet opening, an inlet conduit, an outlet opening and an outlet conduit. The inlet conduit is in communication with the inlet opening and the fluid dispersion area to facilitate communication of fluid from the inlet opening to the fluid dispersion area and the outlet conduit is in communication with the fluid dispersion area and the outlet opening to facilitate communication of fluid between the fluid dispersion area and the outlet opening.

40 Claims, 17 Drawing Sheets

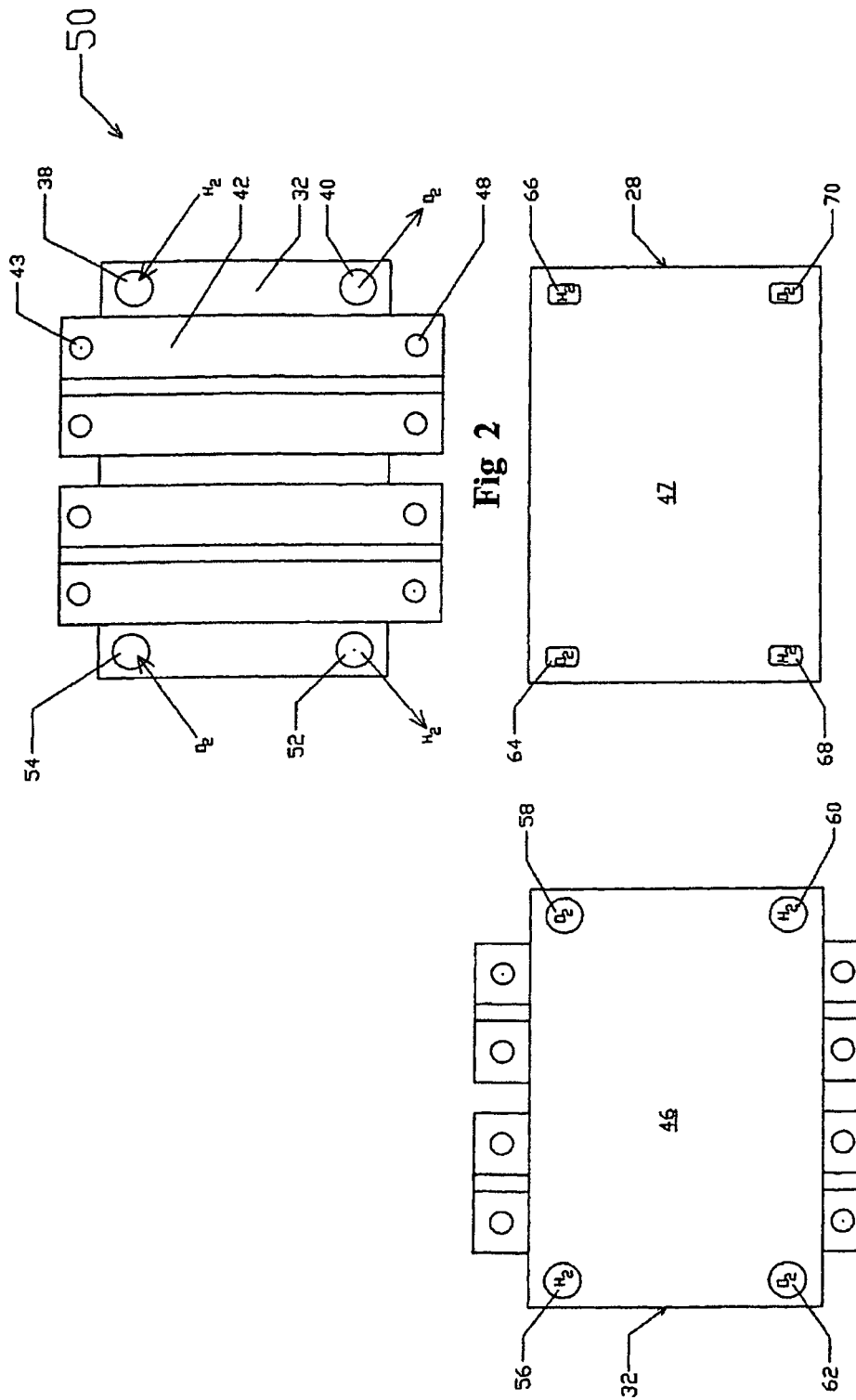

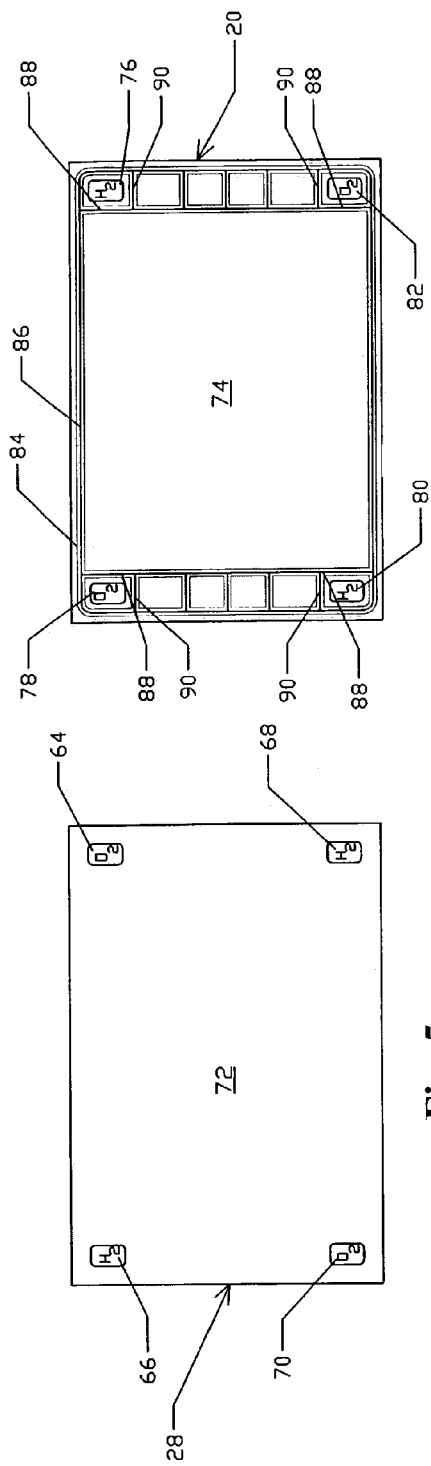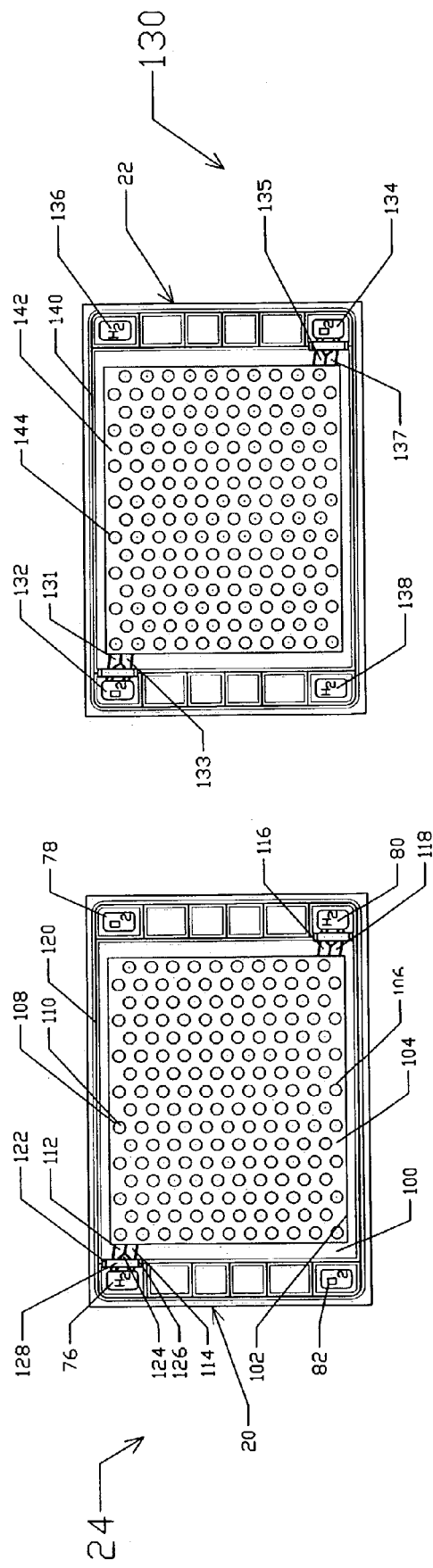

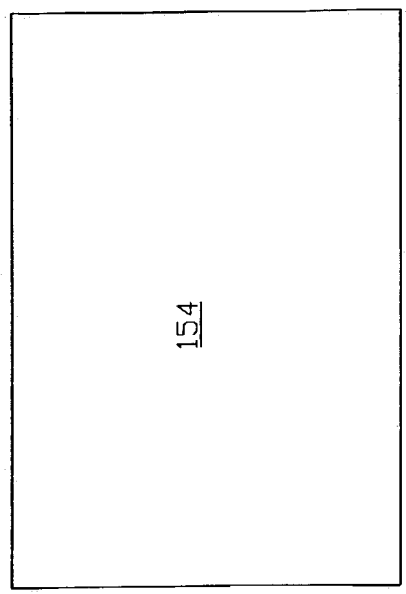
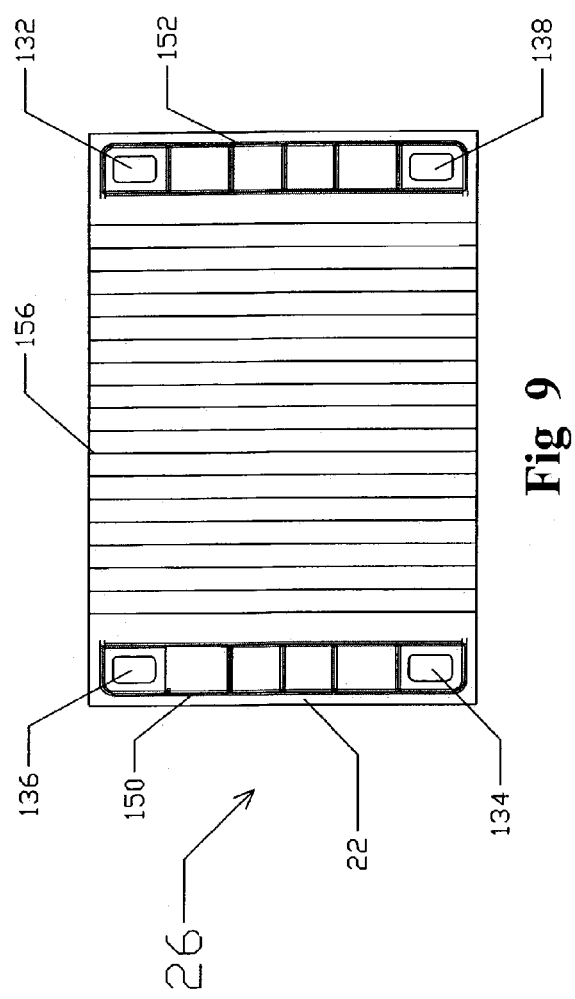

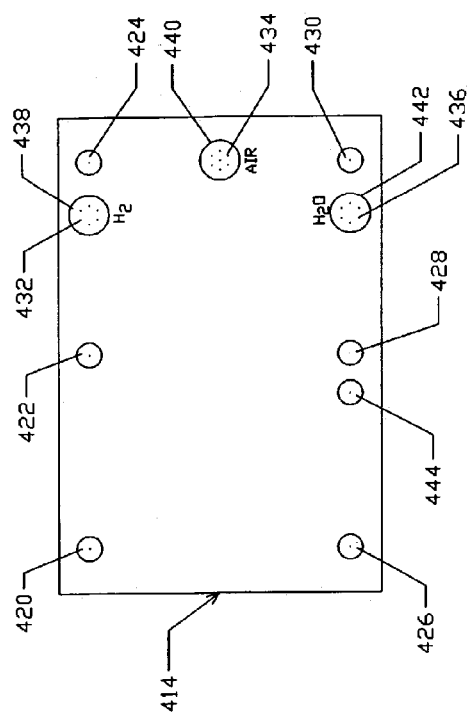
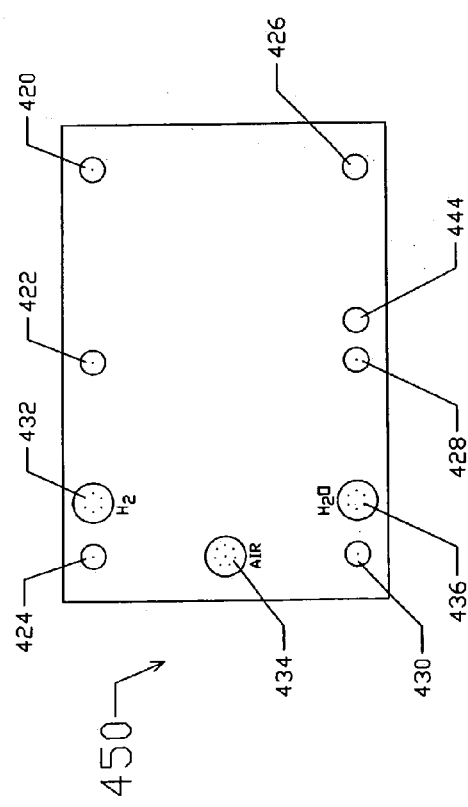
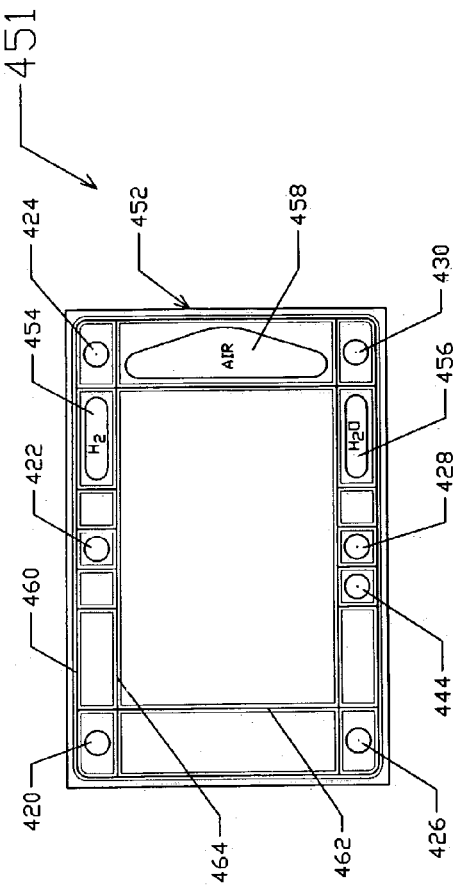
Fig 15
Fig 16
Fig 17

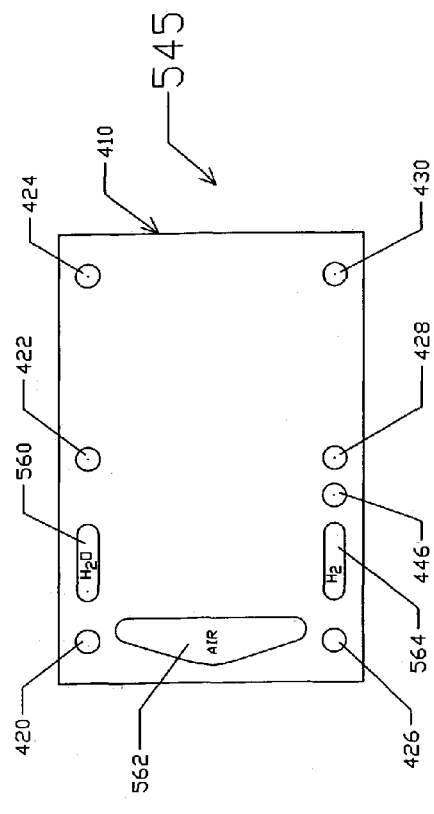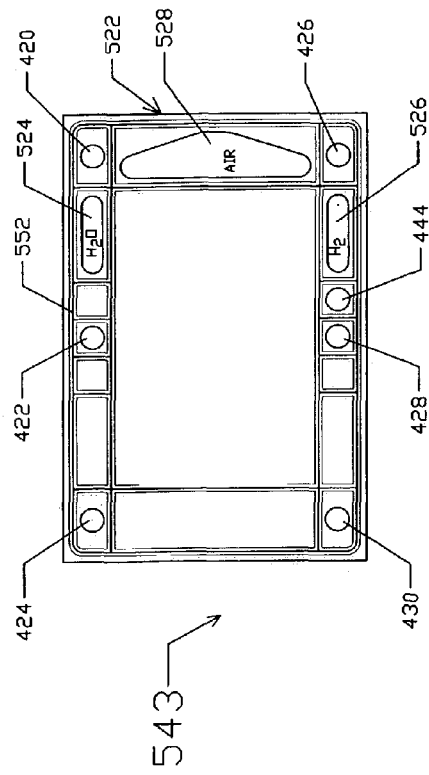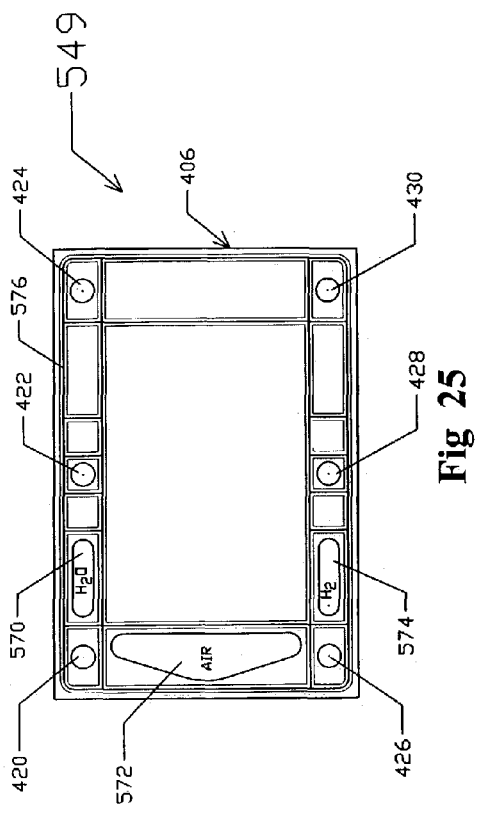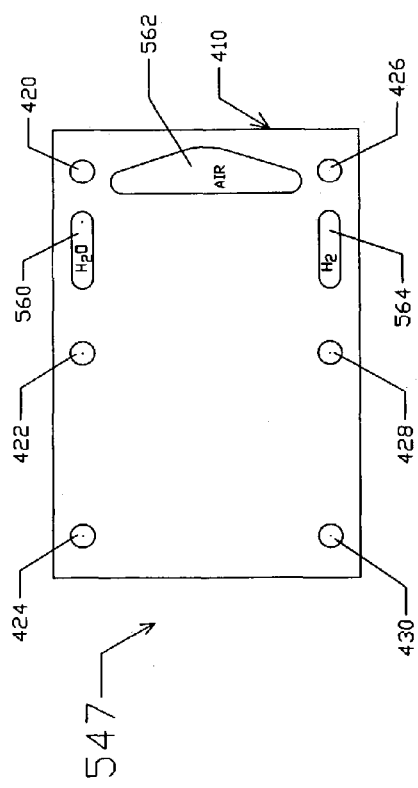
Fig 22
Fig 23
Fig 24
Fig 25

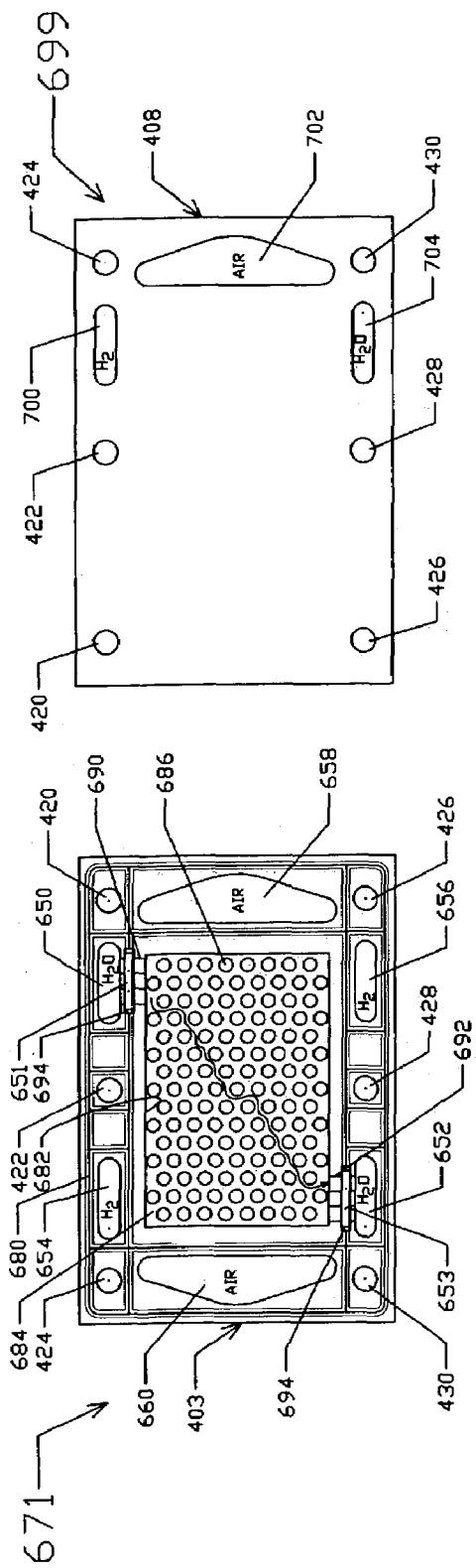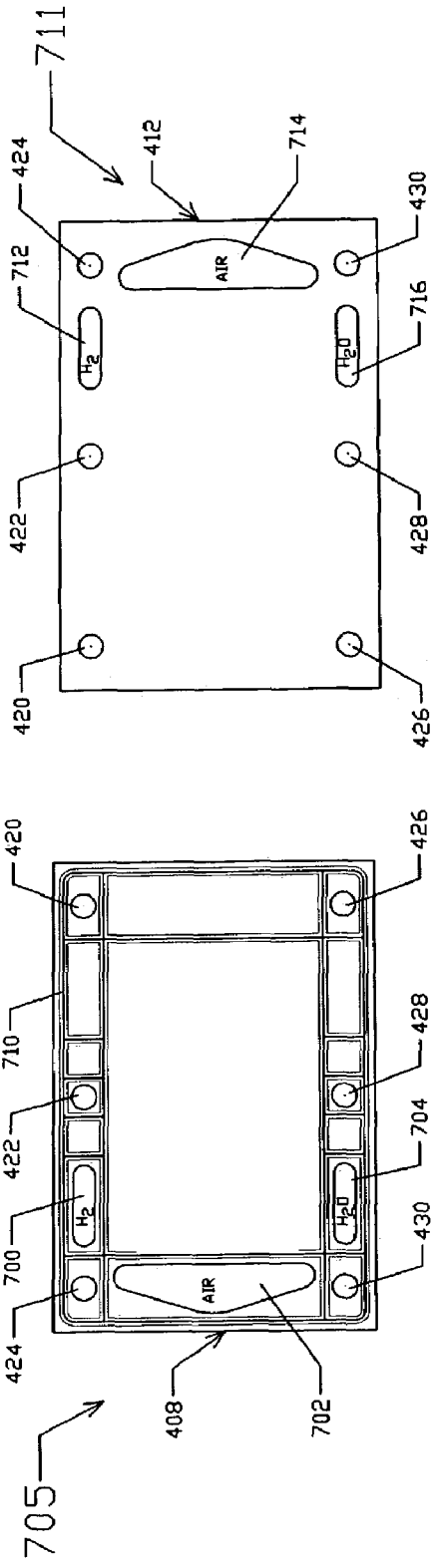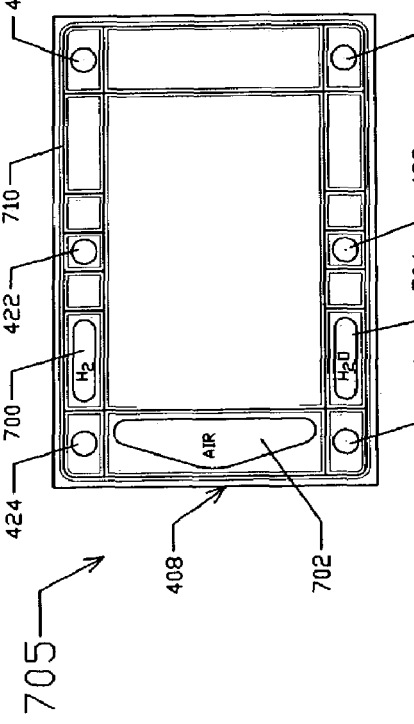

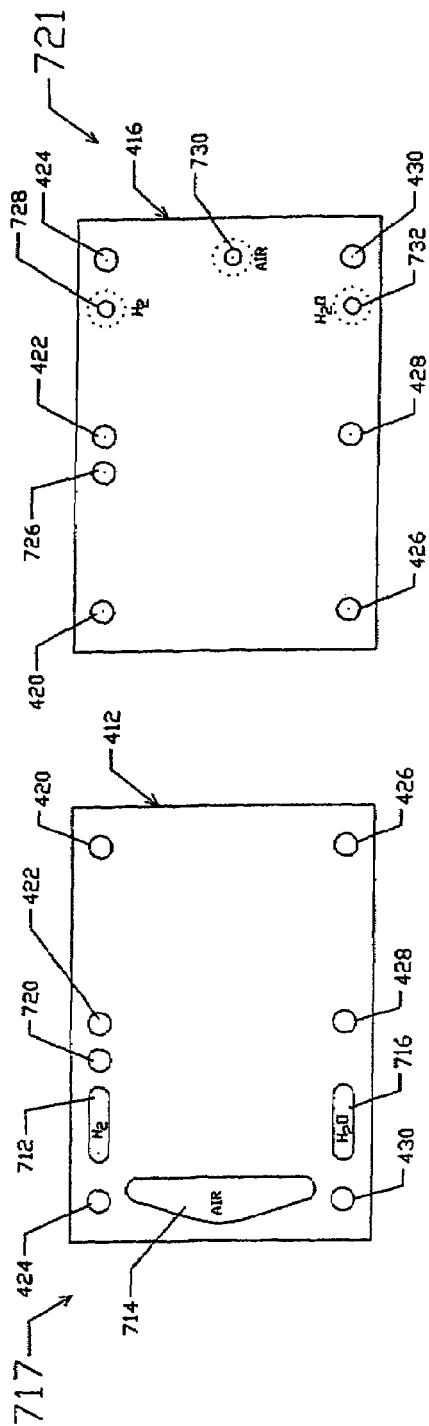
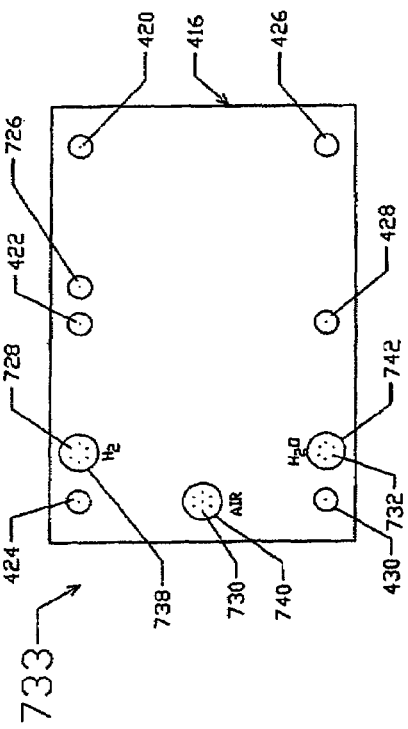
Fig 34
Fig 35
Fig 36

APPARATUS AND METHOD FOR CONDUCTING FLUID IN A FUEL CELL AND FUEL CELL EMPLOYING SAME

BACKGROUND OF THE INVENTION

1. Field of Invention

The present invention relates to electrochemical fuel cells and more particularly to a reactant supply apparatus for a fuel cell, a fuel cell and fuel cell stack employing the same.

2. Description of Related Art

Electrochemical fuel cells convert fuel and an oxidant to electricity and a reaction product. A typical fuel cell includes a cathode, an anode, and a membrane. The membrane is sandwiched between the cathode and anode. Fuel, in the form of hydrogen, is supplied to the anode where a catalyst, usually platinum, catalyzes the following anode reaction.

Anode reaction: $H_2 \rightarrow 2H^+ + 2\bar{e}$

Hydrogen separates into hydrogen ions and electrons. The hydrogen (cations) migrate through the membrane to the cathode. The electrons migrate via an external circuit in the form of electricity.

An oxidant, such as pure oxygen or air containing oxygen, is supplied to the cathode where it reacts with the hydrogen ions that have crossed the membrane and with the electrons from the external circuit to form liquid water as the reaction product. The cathode reaction is also usually catalyzed by platinum and occurs as follows.

Cathode reaction: $\frac{1}{2}O_2 + 2H^+ + 2\bar{e} \rightarrow H_2O$

Thus the fuel cell generates electricity and water through the electrochemical reaction. Water is formed at the cathode.

Typically, the electrochemical reaction also supports a phenomenon called water pumping. As each cation (proton) migrates through the membrane, it transports or drags along several water molecules with it. Thus, there is a net transport of water to the cathode. Water pumping adds water to the product water formed at the cathode as a result of the electrochemical reaction in the fuel cell.

Solid polymer fuel cells generally comprise a Membrane-Electrode Assembly (MEA). The MEA consists of a solid polymer electrolyte or ion exchange membrane situated between and in contact with two electrodes, made of porous, electrically conducting sheet material, which act as the anode and cathode. The electrodes are typically made from carbon fiber paper or cloth. At the interface of the electrode and membrane is a layer of catalyst to facilitate the electrochemical reaction. The MEA is placed between two electrically conductive plates, commonly formed from graphite. These plates have one or more reactant flow passages impressed on their surfaces. The reactant flow passages direct the flow of a reactant to the electrode and carry away water produced at the cathode due to the fuel cell reaction and due to water pumping.

Conventional reactant flow passages are generally long, narrow and serpentine in shape. Typically, due to capillary action, water adheres to walls of the reactant flow passages, requiring considerable pressure to remove it. Failure to remove this water can result in the accumulation of water at the cathode, and this can create problems for the operation of the fuel cell. The presence of water in the vicinity of the catalyst layer reduces the accessibility of the catalyst to the reactant, a phenomenon commonly referred to as "flooding." Also, the presence of water, often in the form of droplets, can substantially block the flow of oxidant reactant through the reactant flow passages. "Dead spots" can form in areas where channel passages are blocked. In addition, the failure to remove water from the cathode can result in localized hot spots in the membrane as the removal of water is important to cooling the fuel cell. Localized hot spots can result in pinhole failure of the membrane, for example. These conditions can result in a reduction of available power from the fuel cell, or failure in operation of the fuel cell.

SUMMARY OF THE INVENTION

In accordance with one aspect of the invention, there is provided an apparatus for conducting fluid in a fuel cell. The apparatus includes a unitary gas-impermeable body having, a face having a recessed surface and a wall extending around the recessed surface, the recessed surface and the wall defining a fluid dispersion area. The apparatus further includes a plurality of spaced apart protrusions protruding from the recessed surface in the fluid dispersion area such that portions of the recessed surface extend all around each of the protrusions, each protrusion having a protrusion surface spaced apart from the recessed surface. The apparatus further includes an inlet opening, an inlet conduit, an outlet opening and an outlet conduit. The inlet conduit is in communication with the inlet opening and the fluid dispersion area to facilitate communication of fluid from the inlet opening to the fluid dispersion area and the outlet conduit is in communication with the fluid dispersion area and the outlet opening to facilitate communication of fluid between the fluid dispersion area and the outlet opening.

The recessed surface may be generally planar. It may have a generally rectangular shape, a generally trapezium shape, or it a length and a width, with the width decreasing from a first width adjacent the inlet opening to a second width adjacent the outlet opening.

The inlet conduit may include a first plurality of conduits and may include a distribution area between the inlet opening and the first plurality of conduits for distributing fluid to the first plurality of conduits for communication to the fluid dispersion area.

The outlet conduit may include a second plurality of conduits and may include a receiving area between the second plurality of conduits and the outlet opening for receiving fluid from the second plurality of conduits for exhaust through the outlet opening.

The body may be formed from a castable electrically-conductive corrosion-resistant material such as graphite or it may be formed from a metal coated with at least one of graphite powder, titanium, and gold.

Each protrusion surface may have a generally curved shape or it may have at least one of a rectangular, circular and triangular shape. Each protrusion surface lies in a common plane and may be disposed approximately 0.5 to 0.8 mm from the recessed surface. The recessed surface has a total recessed surface area and each protrusion surface has a respective protrusion surface area, where a sum of the respective protrusion surface areas may be approximately equal to the total recessed surface area.

The plurality of spaced apart protrusions may be arranged in rows and columns. Alternate columns of protrusions may be staggered relative to adjacent columns. Each protrusion may be spaced apart from adjacent contacts by a common distance.

The body may have a groove extending around the recessed surface, for receiving a seal for sealing the face to the gas diffusion layer.

The apparatus may include a first bridge member and the face may have a first support surface adjacent the inlet conduit for supporting the first bridge member over the inlet conduit. The groove may include groove portions adjacent the first support surface and the seal may include an inner portion operable to lie in the groove portions and the first bridge member may be operable to support the inner portion of the seal.

The body may include a plate, the face being on the plate and being generally flat. The plate may include cooling provisions and these may include parallel spaced apart grooves formed in the plate.

The protrusions may be formed in an array defining an active area of the plate and the cooling provisions may be disposed opposite the active area.

The body may have an inwardly facing side and an outwardly facing side, the recessed surface being formed in the inwardly facing side. The inwardly facing side may be operable to contact a gas diffusion layer of a membrane of the fuel cell and the grooves may be formed in the outwardly facing side to facilitate cooling.

The cooling provisions may be formed in the outwardly facing side and may include a second recessed surface and a second wall extending around the second recessed surface, the second recessed surface and the second wall defining a second fluid dispersion area. The cooling provisions may further include a second plurality of spaced apart protrusions protruding from the second recessed surface in the second fluid dispersion area such that portions of the second recessed surface extend all around each of the protrusions, each protrusion having a protrusion surface spaced apart from the second recessed surface. The cooling provisions may further include a second inlet opening operable to receive cooling fluid, a second inlet conduit, a second outlet opening and a second outlet conduit. The second inlet conduit is in communication with the second inlet opening and the second fluid dispersion area to facilitate communication of cooling fluid from the second inlet opening to the second fluid dispersion area and the second outlet conduit is in communication with the second fluid dispersion area and the second outlet opening to facilitate communication of the cooling fluid between the second fluid dispersion area and the second outlet opening.

The apparatus may further include openings extending through the plate, adjacent the recessed surface, for receiving mounting rods therethrough, for mounting the plate in a fuel cell or fuel cell stack.

The apparatus may include a conduit opening in the body for receiving a conduit operable to conduct electrical power from the fuel cell.

In accordance with another aspect of the invention, there is provided a fuel cell stack apparatus. The apparatus includes a first fuel cell membrane assembly having a proton exchange membrane and anode and cathode gas diffusion layers on opposite sides of the proton exchange membrane. The apparatus further includes a first fluid supply apparatus comprising a gas impermeable body having a first inwardly facing side and a first outwardly facing side, the first inwardly facing side being in contact with the anode gas diffusion layer. The first inwardly facing side includes a first recessed surface and a first wall extending around the first recessed surface, the first recessed surface and the first wall defining a first fluid dispersion area. The first inwardly facing side further includes a first plurality of spaced apart protrusions protruding from the recessed surface in the fluid dispersion area such that portions of the recessed surface extend all around each of the protrusions. Each protrusion has a protrusion surface spaced apart from the recessed surface, the protrusion surfaces being operable to contact the anode gas diffusion layer. The first fluid supply apparatus further includes a first inlet opening for receiving anode reactant fluid, a first inlet conduit, a first outlet opening and a first outlet conduit. The first inlet conduit is in communication with the first inlet opening and the first fluid dispersion area to facilitate communication of anode reactant fluid from the first inlet opening to the first dispersion area. The first outlet conduit is in communication with the first dispersion area and the first outlet opening to facilitate communication of anode reactant fluid between the first dispersion area and the first outlet opening.

The fuel cell stack apparatus further includes a second fluid supply apparatus comprising a unitary gas-impermeable body. The body has a second inwardly facing side and a second outwardly facing side, the second inwardly facing side being in contact with the cathode gas diffusion layer and having a second recessed surface and a second wall extending around the second recessed surface. The second recessed surface and the second wall define a second fluid dispersion area. The second inwardly facing side also has a second plurality of spaced apart protrusions protruding from the second recessed surface such that portions of the second recessed surface extend all around each of the protrusions, each protrusion having a protrusion surface spaced apart from the second recessed surface. The second fluid supply apparatus further includes a second inlet opening operable to receive cathode reactant fluid, a second inlet conduit, a second outlet opening and a second outlet conduit. The second inlet conduit is in communication with the second inlet opening and the second recessed surface to facilitate communication of cathode reactant fluid from the second inlet opening to the second recessed surface and the second outlet conduit is in communication with the second recessed surface and the second outlet opening to facilitate communication of excess cathode reactant fluid and cooling fluid from the cathode gas diffusion layer from the second recessed surface to the second outlet opening.

The second outwardly facing side of the second fluid supply apparatus may include cooling provisions for cooling the second fluid supply apparatus.

The cooling provisions may include a third face on the second fluid supply apparatus, the third face having a third recessed surface and a third wall extending around the third recessed surface. The third recessed surface and the third wall may define a third fluid dispersion area. The cooling provisions may further include a third plurality of spaced apart protrusions protruding from the third recessed surface in the third fluid dispersion area such that portions of the third recessed surface extend all around each of the protrusions. Each protrusion may have a protrusion surface spaced apart from the recessed surface. The cooling provisions may further include a third inlet opening for receiving cooling fluid, a third inlet conduit, a third outlet opening for draining cooling fluid and a third outlet conduit. The third inlet conduit is in communication with the third inlet opening and the fluid dispersion area to facilitate communication of cooling fluid from the third inlet opening to the third fluid dispersion area and the third outlet conduit is in communication with the third fluid dispersion area and the third outlet opening to facilitate communication of cooling fluid between the third fluid dispersion area and the third outlet opening.

The cooling provisions may comprise a plurality of parallel grooves in the outwardly facing side of the second fluid supply apparatus. The grooves may be operable to conduct cooling fluid to facilitate cooling of the second fluid supply apparatus.

The apparatus may further include first and second current collector plates in contact with the first and second fluid supply apparatuses respectively. Each of the first and second current collector plates may have an inwardly facing side and an outwardly facing side. First and second electrical conduits may be secured to at least one of the inwardly and outwardly facing sides of the first and second current collector plates respectively. First and second insulators may be disposed on the first and second conduits respectively. The first and second conduits may be secured to the first and second current collector plates such that the first and second conduits extend through openings in components of the fuel cell and are insulated from the components by the first and second insulators, such that the first and second conduits extend from a same end of the fuel cell.

In accordance with another aspect of the invention, there is provided a fuel cell stack apparatus including a first fuel cell comprising a first membrane assembly having a first membrane and a first anode gas diffusion layer and a first cathode gas diffusion layer on opposite sides of the first membrane. The apparatus further includes first anode and first cathode fluid distribution devices for supplying anode gas and cathode gas respectively to the first anode gas diffusion layer and the first cathode gas diffusion layer respectively. The first anode and cathode fluid distribution devices have first inwardly and first outwardly facing sides respectively. The first inwardly facing side of the first anode fluid distribution device is in contact with the first anode gas diffusion layer and the first inwardly facing side of the cathode fluid distribution device is in contact with the first cathode gas diffusion layer. The first outwardly facing side of the first cathode fluid distribution device has a first plurality of grooves formed therein for conducting cooling fluid to cool the first cathode fluid distribution device.

The fuel cell stack may further include a second fuel cell comprising a second membrane assembly having a second membrane and a second anode gas diffusion layer and a second cathode gas diffusion layer on opposite sides of the second membrane. The fuel cell stack may further include second anode and second cathode fluid distribution devices for supplying anode gas and cathode gas respectively to the second anode gas diffusion layer and the second cathode gas diffusion layer respectively. The second anode and cathode fluid distribution devices may have second inwardly and second outwardly facing sides respectively. The second inwardly facing side of the second anode fluid distribution device may be in contact with the second anode gas diffusion layer and the second inwardly facing side of the cathode fluid distribution device may be in contact with the second cathode gas diffusion layer. The second outwardly facing side of the second anode fluid distribution device may be in contact with the first outwardly facing side of the first cathode fluid supply device. The second outwardly facing side of the second anode fluid distribution device may have a second plurality of grooves formed therein, the second plurality of grooves being aligned with the first plurality of grooves on the first cathode fluid distribution device to form cooling conduits for conducting cooling fluid.

In accordance with another aspect of the invention, there is provided a fuel cell stack apparatus including at least one fuel cell comprising a first membrane assembly having a first membrane and a first anode gas diffusion layer and a first cathode gas diffusion layer on opposite sides of the first membrane. The fuel cell stack further includes first anode and first cathode fluid distribution devices for supplying anode gas and cathode gas respectively to the first anode gas diffusion layer and the first cathode gas diffusion layer respectively. The first anode and cathode fluid distribution devices have first inwardly and first outwardly facing sides respectively. The first inwardly facing side of the first anode fluid distribution device is in contact with the first anode gas diffusion layer and the first inwardly facing side of the cathode fluid distribution device is in contact with the first cathode gas diffusion layer. The fuel cell stack further includes first and second current collector plates in contact with the first and second fluid supply apparatuses respectively. Each of the first and second current collector plates has an inwardly facing side and an outwardly facing side. First and second electrical conduits may be secured to at least one of the inwardly and outwardly facing sides of the first and second current collector plates respectively. First and second insulators may be disposed on the first and second conduits respectively. The first and second conduits are secured to the first and second current collector plates such that the first and second conduits extend through openings in components of the fuel cell and are insulated from the components by the first and second insulators, such that the first and second conduits extend from a same end of the fuel cell.

In accordance with another aspect of the invention, there is provided a method of evacuating water from a cathode gas diffusion layer of a fuel cell membrane assembly. The method involves receiving water from the cathode gas diffusion layer in a dispersion area of a unitary gas-impermeable reactant supply apparatus having a plurality of protrusions protruding from a recessed surface extending all around each protrusion. The protrusions contact the fuel cell electrode and are sufficiently spaced apart to permit the water to flow freely past the contacts in the dispersion area. The method further involves forcing a pressurized cathode gas employed in a reaction in the fuel cell into the dispersion area in sufficient quantity to supply the cathode gas to the reaction while using excess of the cathode gas to force the water out of an outlet opening in the reactant supply apparatus, in communication with the dispersion area.

In accordance with another aspect of the invention there is provided a fuel cell system comprising a fuel cell operable to receive fuel cell reactants and comprising a passageway for conducting cooling water therethrough and a humidifier connected to the fuel cell. The humidifier has a water inlet, a water disperser and a water outlet. The water inlet is operable to receive water from a water supply. The water disperser is operable to cause at least some of the water received at the water inlet to be absorbed into at least one reactant of the fuel cell. The water outlet is operable to receive unabsorbed water from the disperser and is in communication with the cooling passageway to direct the unabsorbed water to the cooling passageway for use in cooling the fuel cell.

The fuel cell may include first and second reactant supply openings, at least one of the reactant supply openings being in communication with the disperser to receive humidified fuel cell reactant therefrom.

The fuel cell may have first and second reactant supply openings and the humidifier may have first and second reactant supply ports and first and second reactant supply passages in communication with the first and second reactant supply ports respectively for receiving first and second fuel cell reactants respectively. The first and second reactant supply passages may be in communication with the first and second reactant supply openings respectively such that the first and second reactants and the cooling water are supplied to the fuel cell through the humidifier.

The water disperser may include a first plate, a water permeable membrane and a second plate. The first plate may have a plurality of channels extending between the water inlet and the water outlet. The second plate may have a plurality of channels extending between at least one of the first and second reactant supply ports and a corresponding one of the first and second reactant supply passages. The first and second plates may be disposed on opposite sides of the water permeable membrane to facilitate migration of water from the channels in the first plate to reactant in the channel in the second plate to humidify fuel cell reactant in the channels in the second plate.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 2 is an end view of the fuel cell apparatus shown in FIG. 1;

FIG. 3 is a plan view of an inwardly facing side of an anode end plate of the fuel cell apparatus shown in FIG. 1;

FIG. 4 is a plan view of an outwardly facing side of an anode current collector plate shown in FIG. 1;

FIG. 5 is a plan view of an inwardly facing side of the anode current collector plate;

FIG. 6 is a plan view of an outwardly facing side of the first fluid supply apparatus of the fuel cell shown in FIG. 1;

FIG. 7 is a plan view of an inwardly facing side of the first fluid supply apparatus of FIG. 6;

FIG. 8 is a plan view of an inwardly facing side of a second fluid supply apparatus of the fuel cell shown in FIG. 1;

FIG. 9 is a plan view of an outwardly facing side the second fluid supply apparatus shown in FIG. 8;

FIG. 10 is a plan view of a cathode current collector plate of the fuel cell apparatus shown in FIG. 1;

FIG. 15 is a plan view of an end plate of the fuel cell apparatus shown in FIG. 14;

FIG. 16 is a plan view of an inwardly facing side of the end plate shown in FIG. 15;

FIG. 17 is a plan view of an outwardly facing side of a first humidifier plate of a humidifier of the fuel cell apparatus shown in FIG. 14;

FIG. 22 is a plan view of an inwardly facing side of the third humidifier plate of FIG. 21;

FIG. 23 is a plan view of an outwardly facing side of a first current collector plate of the fuel cell apparatus shown in FIG. 14;

FIG. 24 is a plan view of an inwardly facing side of the current collector plate shown in FIG. 23;

FIG. 25 is a plan view of an outwardly facing side of a first cooling plate of the fuel cell apparatus shown in FIG. 14;

FIG. 30 is a plan view of an outwardly facing side of the cathode fluid supply apparatus shown in FIG. 29;

FIG. 31 is a plan view of an inwardly facing side of a second cooling plate of the humidifier apparatus shown in FIG. 14;

FIG. 32 is a plan view of an outwardly facing side of the humidifier plate shown in FIG. 31;

FIG. 33 is a plan view of an inwardly facing side of a second current collector plate of the fuel cell apparatus shown in FIG. 14;

FIG. 34 is a plan view of an outwardly facing side of the current collector plate shown in FIG. 33;

FIG. 35 is a plan view of an inwardly facing side of an end plate of the fuel cell apparatus shown in FIG. 14; and FIG. 36 is a plan view of a second end view of the fuel cell apparatus shown in FIG. 14;

DETAILED DESCRIPTION

Figure 1:
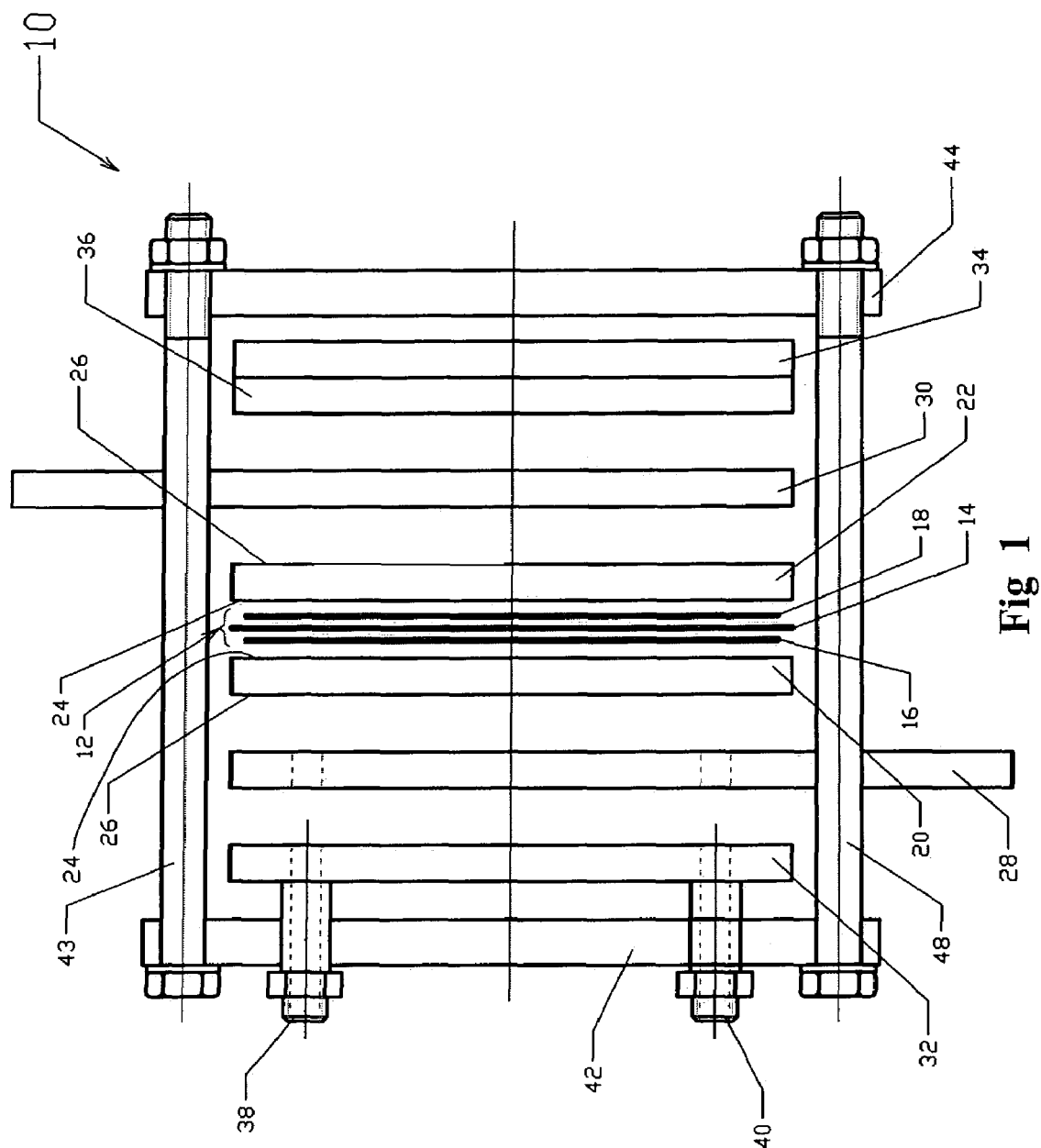
FIG. 1 is an exploded side view of a fuel cell apparatus according to a first embodiment of the invention.

Referring to FIG. 1, a fuel cell apparatus according to a first embodiment of the invention is shown generally at 10 in an exploded side view. The apparatus includes a Membrane-Electrode Assembly (MEA) shown generally at 12 comprising a proton-exchange membrane 14 and anode and cathode carbon-cloth gas diffusion layers 16 and 18, respectively, forming anode and cathode sides of the MEA, respectively. The fuel cell apparatus 10 further includes first and second fluid supply apparatus 20 and 22 operable to contact the anode and cathode gas diffusion layers 16 and 18, respectively, and to deliver anode reactant (hydrogen gas) and cathode reactant (oxygen gas) to the anode and cathode gas diffusion layers 16 and 18, respectively.

The first and second fluid supply apparatus 20 and 22 have inwardly and outwardly facing sides 24 and 26, respectively. The inwardly facing sides 24 contact the anode and cathode gas diffusion layers 16 and 18, respectively, and the outwardly facing sides 26 face outwardly away from the MEA and contact anode and cathode current collector plates 28 and 30, respectively, in the embodiment shown. Anode and cathode end plates 32 and 34 contact the anode and cathode current collector plates 28 and 30, respectively.

The cathode end plate 34 includes a rubber gasket 36 disposed between the cathode current collector plate 30 and the cathode end plate 34.

The anode end plate 32 has a plurality of openings to which are secured fluid connectors, only two of which are shown at 38 and 40, for connecting to hydrogen reactant supply and oxygen reactant exhaust conduits, respectively (not shown). Clamping members, only two of which are shown at 42 and 44, extend across and beyond the outer perimeter of the anode and cathode end plates 32 and 34, respectively, and are pulled together by bolts, only two of which are shown at 43 and 48, respectively, to securely hold all the components together in tight mechanical proximity.

Referring to FIG. 2, an end view of the fuel cell apparatus of FIG. 1 is shown generally at 50. In this view it can be seen that the anode end plate 32 has four openings, to which are connected the hydrogen supply connector 38, oxygen exhaust connector 40 and to Which are further connected a hydrogen exhaust connector 52 and an oxygen supply connector 54.

Referring to FIG. 3, an inwardly facing side 46 of the anode end plate 32 is shown. The inwardly facing side 46 is flat with the exception of hydrogen and oxygen supply openings 56 and 58 and hydrogen and oxygen exhaust openings 60 and 62 in communication with the hydrogen and oxygen supply connectors 38 and 54 and the hydrogen and oxygen exhaust connectors 52 and 40, respectively. The inwardly facing side 46 abuts an outwardly facing side 47 of the anode current collector plate 28 shown in FIG. 4.

Referring to FIG. 4, the anode current collector plate 28 has a flat planar surface and has four rectangular openings including an oxygen supply opening 64, a hydrogen supply openings 66, a hydrogen exhaust opening 68 and an oxygen exhaust opening 70.

Referring to FIGS. 3 and 4, openings 56 and 66, 58 and 64, 60 and 68, and 62 and 70 are in communication with each other when sides 46 and 47 are in contact with each other.

Referring to FIG. 5, an inwardly facing side 72 of the anode current collector plate 28 is shown. This inwardly facing side 72 has a generally flat planar surface with four rectangular openings 64, 66, 68 and 70 extending therethrough. This inwardly facing side 72 abuts an outwardly facing side 74 of the first supply apparatus 20 shown in FIG. 6.

Referring to FIG. 6, in this embodiment, the first fluid supply apparatus 20 comprises a unitary gas impermeable body in the shape of a plate about 3 mm thick. The body may be formed from a castable, electrically conductive corrosion resistant material such as graphite, for example. Alternatively, the body may be formed from a metal and be coated with graphite powder, titanium or gold, for example. The first fluid supply apparatus 20 includes four openings disposed in the four corners thereof, including hydrogen and oxygen supply openings 76 and 78, and hydrogen and oxygen exhaust openings 80 and 82, respectively, which are in communication with openings 66, 64, 68 and 70, respectively. A groove 84 is formed in a perimeter of the outwardly facing side 74 and is operable to receive a gasket 86 therein. The gasket 86 has adjacent portions, only two of which are shown at 88 and 90, around each opening 76, 78, 80 and 82, such that portions of the gasket extending about the perimeter of the face and the adjacent portions 88 and 90 completely surround each opening 76, 78, 80 and 82 to seal the outwardly facing side 74 against the mating inwardly facing side 72 of the anode current collector plate 28 shown in FIG. 5 to prevent escape of gas between the inwardly facing side 72 of the anode current collector plate 28 and the outwardly facing side 74 of the first fluid supply apparatus 20.

Referring to FIG. 7, the inwardly facing side 24 of the first fluid supply apparatus 20 may also be referred to as a first face side, and has a planar surface 100 and a wall 102, defining a first generally rectangular shaped recessed surface 104. A first plurality 106 of spaced apart contacts 108 protrude from the first recessed surface 104 such that portions of the first recessed surface extend all around each of the contacts 108. Each contact 108 has a contact surface 110 spaced apart from the first recessed surface 104 by about 0.5 to 0.8 mm and each contact surface lies generally in the same plane as the planar surface 100. The contacts 108 are arranged in rows and columns with adjacent columns being staggered so that fluid travelling between two adjacent contacts in a column is dispersed by a contact aligned between the two adjacent contacts, in an adjacent column. Each contact is spaced apart from an adjacent contact by the same, common distance which may be about twice the diameter of a contact surface, for example, where the contact surfaces 110 are circular. In this embodiment, each contact surface 110 has a circular shape with a diameter of about 4.76 mm. The contact surfaces 110 may, however, be generally curved shaped, rectangular (e.g., waffle shaped), or triangular, for example. Generally, it is desirable if the total contact surface area is approximately equal to the total area between the contacts, that is, the total recessed area.

The hydrogen supply opening 76 acts as an inlet opening in the body. First and second inlet conduits 112 and 114 are formed in the first inwardly facing side 24 and establish fluid communication between the hydrogen supply opening 76 and the first recessed surface 104 to facilitate communication of reactant from the hydrogen supply opening to the first recessed surface. The first fluid supply apparatus 20 also has first and second outlet conduits 116 and 118 which establish communication between the first recessed surface 104 and the hydrogen exhaust opening 80 to facilitate communication of fluid between the first recessed surface and the hydrogen exhaust opening. The first inwardly facing side 24 is placed in contact with the anode gas diffusion layer 16 shown in FIG. 1, such that a first reactant dispersion area is formed between the first recessed surface 104 and the anode gas diffusion layer whereby reactant received at the hydrogen supply opening 76 is communicated to the first reactant dispersion area and is supplied to the anode gas diffusion layer, between the contacts 108.

The inwardly facing side 24 also has a groove 120 extending around the recessed surface 104 for receiving a polymeric seal (not shown) for sealing the face to the anode gas diffusion layer 16. The groove may be about 4.76 mm in depth and in width, for example. Support surfaces 122, 124 and 126 are formed in the first inwardly facing side 24 adjacent the first and second inlet conduits 112 and 114 and are operable to support a first bridge member 128 transversely over the first and second inlet conduits 112 and 114 to support an inner portion of the seal over the first and second inlet conduits between the groove portions. A similar arrangement is provided adjacent the first and second outlet conduits 116 and 118 to support the corresponding portion of the seal thereover.

Referring back to FIG. 1, in this embodiment, the proton-exchange membrane 14 is formed of a polymer sheet having a thickness of between about 0.050 mm to 0.1778 mm. The anode and cathode gas diffusion layers 16 and 18 are disposed on opposite sides of the proton exchange membrane 14 and provide gas for diffusion layers between the inwardly facing surfaces of the fluid supply apparatus 20 and 22 and the membrane 14. The anode and cathode gas diffusion layers are composed of a cloth woven of carbon fibers, with a slurry of lampblack and a small portion of polytetrafluoroethylene (PTFE or Teflon.RTM.) impressed and sintered into the interstices of the fabric. The proton exchange membrane 14 thereby resides between cushioning "blankets" of carbon cloth infused with carbon and PTFE particles, in turn clamped between the first and second fluid supply apparatus 20 and 22, respectively. A catalyst, usually platinum, is applied as a slurry or paste of platinum-black and lampblack in a dilute solution of the polymer of which the membrane is comprised. The catalyst may be included in the slurry applied to the surface of the gas-diffusion cloth and the membrane. The two cloth layers may then be placed next to the membrane, one on each side, and this three-layer sandwich is hot-pressed together. The polymer component of the slurry bonds to the membrane, uniting the three layers to form an integral structure called the membrane-electrode assembly (MEA).

Alternatively, an ink comprised of minute particles of platinum supported on lampblack particles may be suspended in a solution of the polymer material. The ink-slurry is applied to both surfaces of the membrane, which is then hot-pressed to bond the ink onto the membrane. The polymer material of the ink intimately bonds to the polymer material of the membrane. The ink-coated membrane is referred to as the MEA in this approach. A layer of un-catalyzed gas diffusion cloth is then placed adjacent to each side of the membrane when the cell is assembled.

Referring to FIG. 8, the inwardly facing side 24 of the second fluid supply apparatus 22 is shown generally at 130. This side is the same as the inwardly facing side 24 shown in FIG. 7. The apparatus includes oxygen supply and oxygen exhaust openings 132 and 134, respectively, and hydrogen supply and exhaust openings 136 and 138, respectively. The apparatus further includes a groove arrangement 140, a recessed area 142 and contacts 144. Pure oxygen may be received at the oxygen supply opening 132 and conducted by inlet conduits 131 and 133 into the reactant dispersion area formed between the recessed surface 142 and the cathode gas diffusion layer (18) for use in the fuel cell reaction. Excess oxygen not consumed by the fuel cell reaction may be conducted from the recessed surface 142 by outlet conduits 135 and 137 to the oxygen exhaust opening 134 to be evacuated through the oxygen exhaust opening.

Referring to FIGS. 1, 7 and 8, the first and second fluid supply apparatus 20 and 22, respectively, co-operate with the anode and cathode gas diffusion layers 16 and 18, respectively, such that each gas diffusion layer (16,18) allows reactant gas to diffuse from the dispersion area defined between it and the recessed surface 104, 142 of its respective fluid supply apparatus (20,22), enabling areas (active areas) of the membrane 14 aligned with areas between the contacts 108 and 144 of the respective fluid supply apparatus to become active and generate current.

Each gas diffusion layer 16,18 also forms an electrically conducting path for current generated in the active areas to flow laterally to areas where the contacts 108 and 144 of the respective fluid supply apparatus 20,22 can conduct it perpendicularly through the fuel cell or fuel cell stack. Each gas diffusion layer 16,18 also resiliently conforms to surface irregularities on the membrane 14, improves the electrical contact with the membrane and provides some structural support for the membrane.

In addition, water produced by the electrochemical reaction of the fuel cell at the cathode gas diffusion layer 18, and any water dragged through the membrane by the hydrogen ions employed in the reaction, is received in the dispersion area, in areas between the contacts 144. The water may fall under gravity, for example between adjacent columns or rows of contacts toward the oxygen exhaust opening 134 or may simply be directed toward the oxygen exhaust opening 134 by the flow of oxygen in the dispersion area. Desirably, the contacts 144 are spaced apart such that the surface tension of a water droplet is insufficient to maintain the water droplet between adjacent contacts, causing it to fall between the contacts, when subjected to the force of gravity, when subjected to the oxygen under pressure in the dispersion area and/or when subjected to other forces. The water is free to travel relatively unimpeded between adjacent contacts 144 and has a generally open and variable flow path allowing it to travel relatively easily within the dispersion area for evacuation through the oxygen exhaust opening 134. Water droplets can be received anywhere in the spaces between the contacts 144 and thus flow paths of the water droplets from their point of entry into the dispersion area to the oxygen exhaust opening 134 can change as required, due to water droplets being formed in other areas of the dispersion area, to take a low impedance path to the oxygen exhaust opening 134 and to quickly clear the area at which the water was received, which allows oxygen in the dispersion area to reach the cathode gas diffusion layer (18). This efficient evacuation of water from the cathode gas diffusion layer (18) provides for a better flow of oxygen to the cathode gas diffusion layer (18), thereby improving the electrical output of the fuel cell apparatus 10.

Pure oxygen may be forced into the oxygen supply opening 132 at a pressure of at least about 5-30 psi at a flow rate of about 3.9 ml/minute/ampere/cell. About 10% of this flow is used to flush the water out of the oxygen exhaust opening 134.

Referring to FIG. 9, the outwardly facing side 26 of the second fluid supply apparatus 22 is formed with first and second groove arrangements 150 and 152, respectively, which have portions surrounding the openings 132, 134, 136 and 138, for receiving corresponding portions of a seal (not shown) therein. The seal is operable to contact a flat face of an inwardly facing side 154 of the cathode current collector plate 30 as seen in FIG. 10.

Referring to FIG. 10, as described above, the inwardly facing side 154 of the cathode current collector plate 30 has a flat planar surface with no openings. The outwardly facing side (not shown) of the cathode current collector plate 30 is the same as the inwardly facing side. The inwardly and outwardly facing sides (not shown) of the cathode end plate 34 shown in FIG. 1 are also flat planar with no openings.

Referring back to FIG. 9, the outwardly facing side 26 of the second fluid supply apparatus 22 may be formed with cooling provisions which, in this embodiment, include parallel spaced apart grooves, one of which is shown at 156 in FIG. 9. The grooves 156 are formed in an area of the body directly opposite the recessed surface (142) where the main source of heat to the body is focused due to the reaction that occurs between the gas delivered by the body and the cathode gas diffusion layer (18) that it contacts. The first fluid supply apparatus 20 may be formed with similar grooves as shown in FIG. 11.

Figure 11:
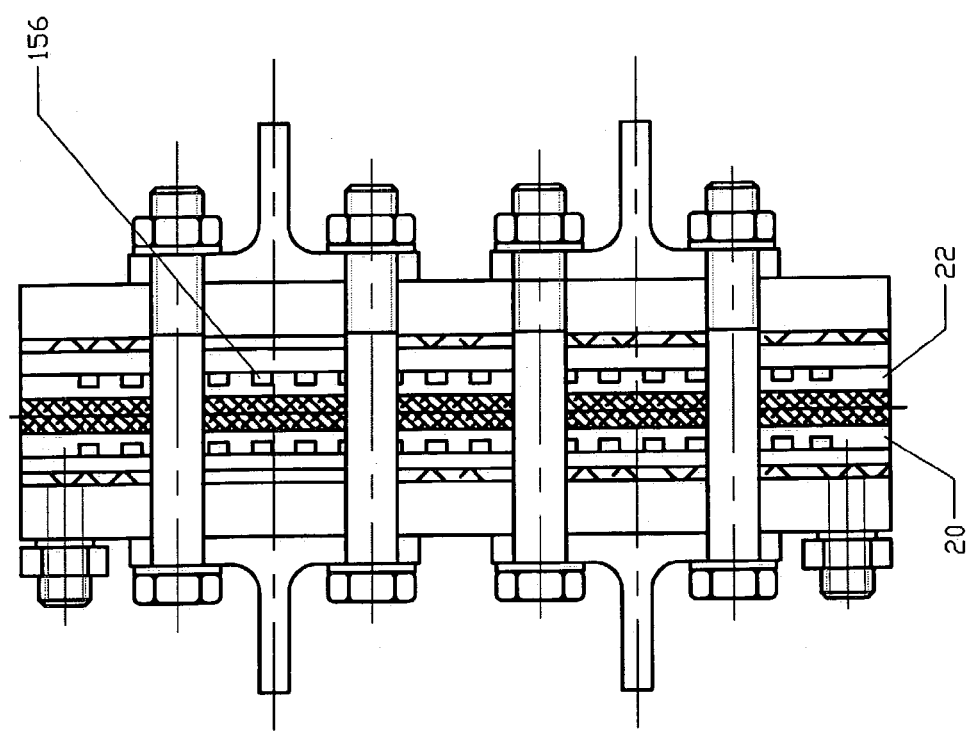
FIG. 11 is a top view of the fuel cell shown in FIG. 1 showing cooling provisions formed in the first and second fluid supply apparatus.

Referring to FIG. 11, the fuel cell apparatus shown in FIG. 1 is seen from above where it will be appreciated that the grooves 156 in the first and second fluid supply apparatus 20 and 22 are oriented parallel to each other and allow cooling air to flow therethrough to cool the respective fluid supply apparatus 20 and 22.

Figure 12:
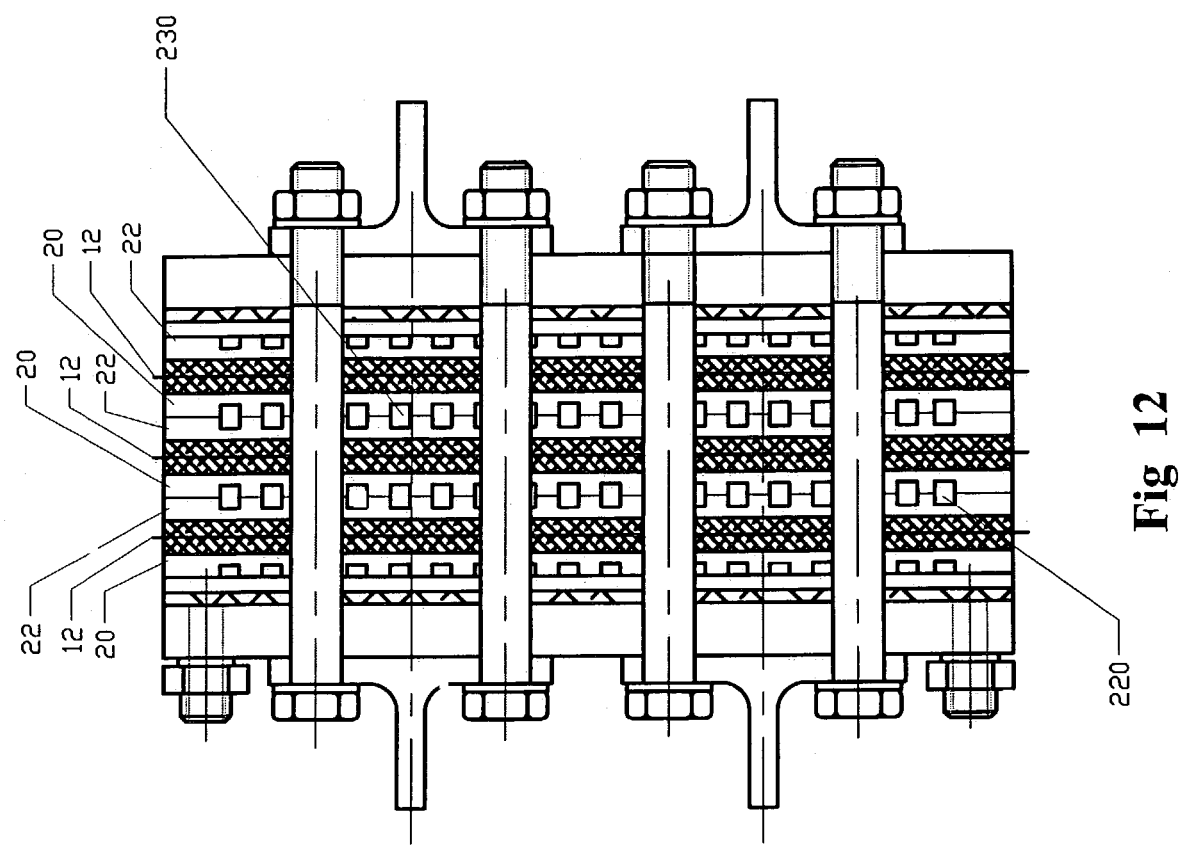
FIG. 12 is a top view of a fuel cell stack according to the second embodiment of the invention showing mating grooves that form conduits to provide for cooling of fluid supply apparatus of individual fuel cells within the stack.

Referring to FIG. 12, it will be appreciated that a fuel cell stack comprising a plurality of fuel cells may be produced by repeating the first fluid supply apparatus 20, MEA 12 and second fluid supply apparatus 22 a number of times to produce a plurality of fuel cells or a fuel cell stack. One such stack having three fuel cells is shown in FIG. 12. In this embodiment, all first fluid supply apparatuses 20 and all second fluid supply apparatuses 22 are formed with the grooves shown in FIG. 9 to form cooling conduits such as shown as 220 and 230, respectively, between abutting fluid supply apparatuses. This provides for a relatively large volume of air to flow in the cooling conduits 220 and 230 to facilitate cooling.

Operation of the apparatus shown in FIG. 1 is described as follows. Referring to FIG. 2, hydrogen received at the hydrogen connector 38 is communicated through the hydrogen supply opening 56 shown in FIG. 3 to the hydrogen supply opening 66 in the current collector plate 28 shown in FIGS. 4 and 5. Hydrogen emanating from the hydrogen supply opening 66 is received in the hydrogen supply opening 76 in the first fluid supply apparatus 20 shown in FIGS. 6 and 7 where it is channeled by the inlet conduits 112 and 114 into the dispersion area among the contacts 108 for distribution among and between the contacts for diffusion into the anode gas diffusion layer (16) of the MEA (12). Excess hydrogen is conducted by the outlet conduits 116 and 118 into the hydrogen exhaust opening 80 where it flows through the hydrogen exhaust opening 68 shown in FIGS. 4 and 5 and into the hydrogen exhaust opening 60 shown in FIG. 3 for extraction from the hydrogen exhaust connector 52 shown in FIG. 2, at the end face of the fuel cell 10.

Similarly, oxygen received at the oxygen supply connector 54 is conducted by the oxygen supply opening 58 shown in FIG. 3 and passes through the oxygen supply opening 64 shown in FIGS. 4 and 5 and through the oxygen supply opening 78 shown in FIGS. 6 and 7 and into the oxygen supply opening 132 in the second fluid supply apparatus 22 shown in FIG. 8. The oxygen is transmitted by channels 131 and 133 into the dispersion area among the plurality of contacts 144 for dispersion into the cathode gas diffusion layer (18) of the MEA (12). Excess oxygen and any water resulting from the fuel cell reaction or dragged through the membrane assembly and received in the dispersion area is communicated by conduits 135 and 137 from the dispersion area into the oxygen exhaust opening 134 where it is communicated through the oxygen exhaust opening 82 of the anode supply plate 20 shown in FIGS. 6 and 7. Oxygen in the cathode reactant exhaust opening 82 is further communicated through the corresponding oxygen exhaust opening 70 of the current collector plate shown in FIGS. 4 and 5 and is further communicated into the oxygen exhaust opening 62 shown in FIG. 3 for extraction via the oxygen exhaust connector 40 at the end face of the fuel cell 10.

Referring to FIG. 11 as the second fluid supply apparatus 22 heats up due to energy released as a result of the fuel cell reaction, cooling air is convectively drawn into the cooling conduits 156 to help cool the second fluid supply apparatus 22, and hence the fuel cell.

Figure 13:
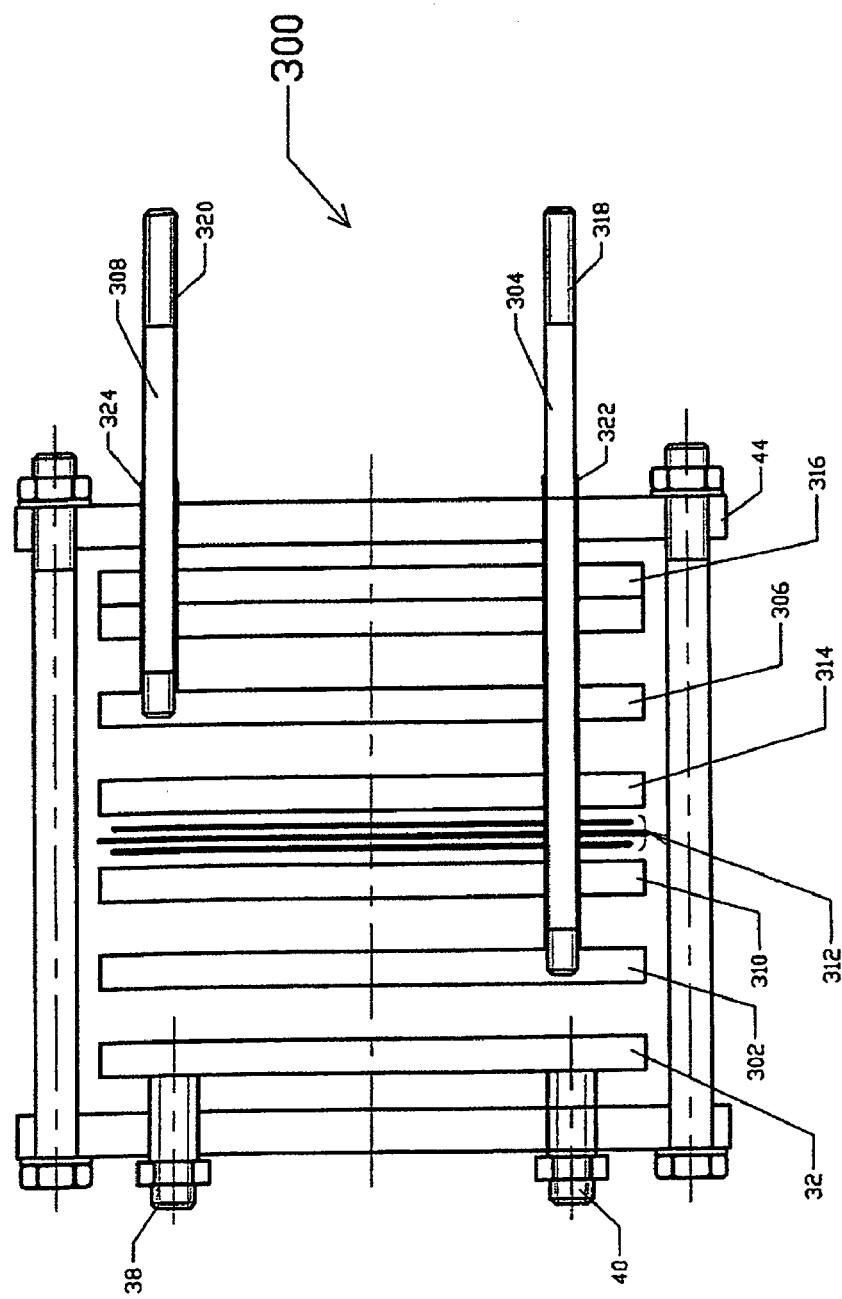
FIG. 13 is an exploded view of a fuel cell apparatus according to an alternative embodiment of the invention in which circuit terminations of the fuel cell are disposed on a same end thereof.

Referring to FIG. 13, an apparatus according to a second embodiment of the invention is shown generally at 300. The apparatus is generally the same as the apparatus shown in FIG. 1, with the exception that the apparatus 300 includes an anode current collector plate 302 to which is secured a first conductor 304. The first conductor 304 may be secured by threaded means to the anode current collector plate 302 or may be press fit therein, for example.

The apparatus 300 also includes a cathode current collector plate 306 to which is secured a second conductor 308 such as by threads or press fit means as described above. The apparatus 300 further includes a first fluid supply apparatus 310, a MEA shown generally at 312 and a second fluid supply apparatus 314. The apparatus 300 also includes an end plate 316. Each of these components is formed with a respective opening therethrough and the cathode current collector plate 306 is formed with an opening therethrough for receiving the first conductor 304 therethrough such that a termination portion 318 of the first conductor 304 extends or protrudes from an end of the fuel cell. Similarly, the end plate 316 is formed with a further opening to permit the second conductor 308 to extend therethrough such that a termination portion 320 thereof extends on a same end of the fuel cell as the circuit termination portion 318 on the first conductor 304. Insulative sleeves 322 and 324 are placed over portions of the first and second conductors 304 and 308, respectively, which extend through the indicated components of the fuel cell to prevent unwanted electrical contact between the first or second conductor 304 and 308, respectively, and the remaining components of the fuel cell. In this manner, both terminals or circuit termination portions 318 and 320 of the fuel cell extend on a same side or same end of the fuel cell, facilitating easy installation.

Figure 14:
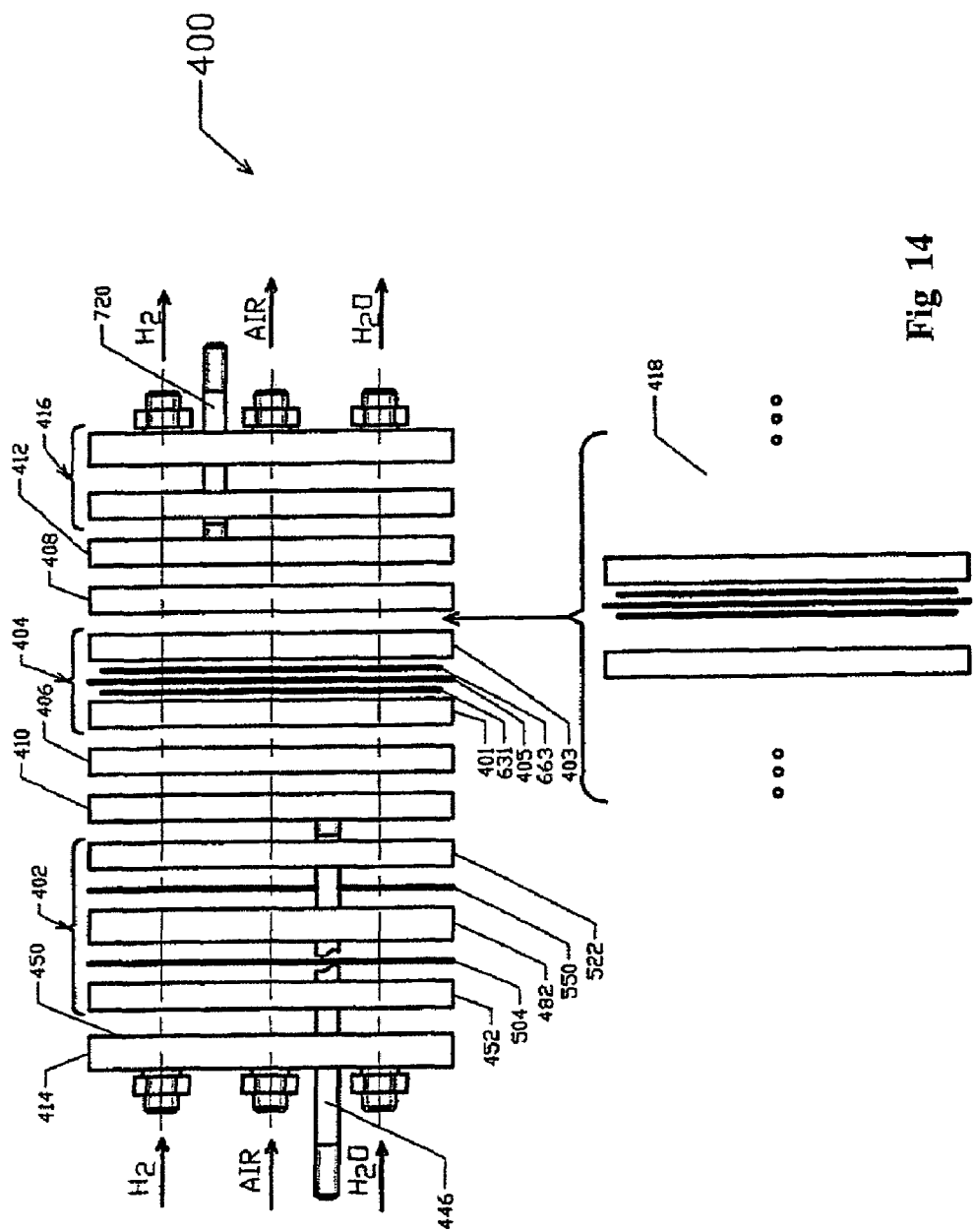
FIG. 14 is an exploded view of a fuel cell apparatus or optional fuel cell stack, according to a third embodiment of the invention.

Referring to FIG. 14, a fuel cell apparatus according to a third embodiment of the invention is shown generally at 400. In this embodiment the fuel cell apparatus includes a humidifier section shown generally at 402 and a fuel cell shown generally at 404, first and second cooling plates 406 and 408, first and second current collector plates 410 and 412 and first and second end plates 414 and 416. It will be appreciated that a fuel cell stack may be formed by adding further fuel cells such as shown at 418 between the first fuel cell 404 and the cooling plate 408 or between the first fuel cell 404 and the cooling plate 406.

In this embodiment, the fuel cell or fuel cell stack is designed to operate using hydrogen gas as the anode reactant and air to supply oxygen as the cathode reactant and employs a water cooling system.

Referring to FIG. 15, the first end plate 414 is shown in plan view. The end plates 414 and 416 and all components between the end plates include mounting holes 420, 422, 424, 426, 428 and 430 that extend entirely therethrough. The first end plate 414 further has hydrogen supply, air supply and water supply openings shown in broken outline at 432, 434 and 436, respectively, to which are connected fluid connectors 438, 440 and 442, respectively. The first fluid connector 438 is for receiving hydrogen gas, the second fluid connector 440 is for receiving air and the third fluid connector 442 is for receiving water. The plate 414 further includes a conductor opening 444 for receiving a first conductor 446 seen best in FIG. 14, the first conductor being connected to the first current collector plate 410 as will be described below.

Referring to FIG. 16, an inwardly facing side of the first end plate 414 is shown generally at 450.

Referring to FIG. 17, a plan view of an outwardly facing side 451 of a first humidifier plate 452 of the humidifier 402 shown in FIG. 14, is shown. The first humidifier plate 452 includes mounting openings which are numbered the same as the mounting openings in FIGS. 15 and 16 to indicate coincidence therewith when the inwardly facing side 450 of the first end plate 414 and the outwardly facing side 451 of the first humidifier plate 452 are placed in contact with each other. The first humidifier plate 452 further has an oblong hydrogen conduction opening 454 and an oblong water inlet opening 456 on opposite sides of the plate. The plate 452 further includes a rounded triangular opening 458 for conducting air. The plate 452 also has a perimeter groove 460, and intermediate vertical and horizontal grooves such as shown at 462 and 464 to form a groove arrangement, such that each of the openings in the plate is surrounded by a portion of the groove. A polymeric seal (not shown) is received in the groove to seal the side 451 shown in FIG. 17, against the side 450 shown in FIG. 16, to prevent escape of hydrogen, air or water from between the plates 450 and 452.

Figure 18:
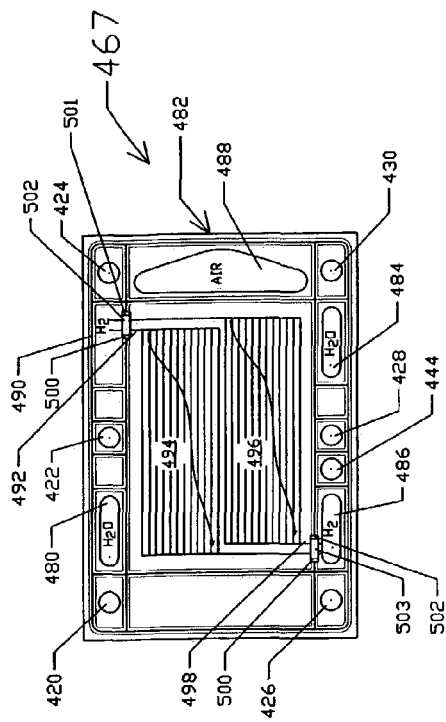
FIG. 18 is a plan view of an inwardly facing side of the first humidifier plate shown in FIG. 17.

Referring to FIG. 18, an inwardly facing side 465 of the first humidifier plate 452 is shown. This side 465 also includes a groove system 466, having portions which surround each opening in the plate 452 and which and are operable to receive a seal (not shown) for sealing this side 465 of the plate 452 against an outwardly facing side 467 of the second humidifier plate 482 shown in FIG. 19. Still referring to FIG. 18, the side 465 shown includes a plurality of conduits shown generally at 470 extending from the water supply opening 456 to respective water channel arrays 472, 474 and 476 each comprised of a plurality of parallel channels extending generally widthwise across the plate and terminated in respective outlet conduits shown generally at 478. The conduits 470 extend transversely through the groove for holding the seal and thus the groove is formed with support portions 480 adjacent the inlet and outlet conduits for supporting a respective bridge member 481. In this embodiment, each bridge member is comprised of an elongated rectangular stainless steel planar member which extends over the conduits to support the seal. It will be appreciated that water received in the water opening 456 is operable to flow through the inlet conduits 470 and through the respective water channel arrays 472, 474 and 476 and into the conduits 478 for conduction to a mating oblong water conduction opening 480 in the adjacent abutting second humidifier plate 482 shown in FIG. 19.

Figure 19:
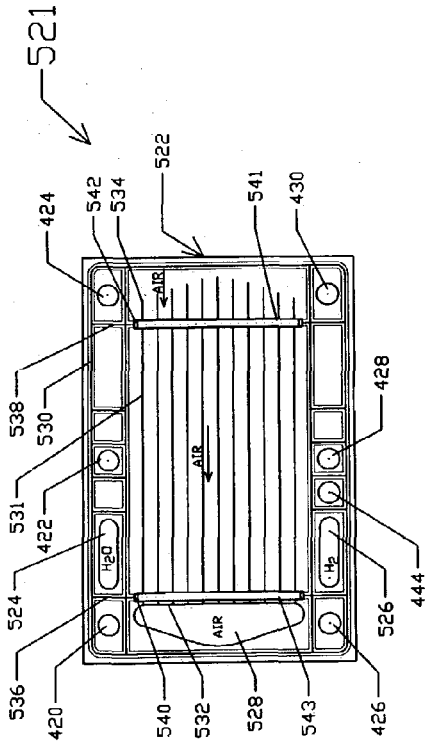
FIG. 19 is a plan view of an outwardly facing side of a second humidifier plate of the fuel cell apparatus shown in FIG. 14.

FIG. 19 shows an outwardly facing side 467 of the second humidifier plate 482. This plate 482 includes the mounting openings 420 to 430 and further includes a second oblong water opening 484, an oblong hydrogen opening 486 and a generally triangular air opening 488. This side 467 also includes a groove arrangement shown generally at 490 comprising grooves which extend about each of the openings to hold a seal (not shown) for sealing the openings against the inwardly facing side 465 of the first humidifier plate 452 shown in FIG. 18. Still referring to FIG. 19, the outwardly facing side 467 of the second humidifier plate 482 includes hydrogen inlet conduits 492 that extend through a groove portion to first and second longitudinally disposed hydrogen channel arrays 494 and 496, respectively, which are terminated in respective conduits 498 which extend through a groove portion adjacent the hydrogen opening 486 and which are in communication therewith. The portion of the groove adjacent the conduits 492 and 498 are formed with support surfaces 500 and 502 for supporting respective stainless steel rectangular bridge members 501,503 thereon for supporting portions of the seal over the conduits 492 and 498, respectively. It will be appreciated that hydrogen received at the conduits 492 is conducted through the arrays 494 and 496, is received in conduits 498 and is channeled into the hydrogen opening 486.

Referring to FIGS. 18 and 19, it will be appreciated that water flows through the water channel arrays 472, 474 and 476 while hydrogen flows through the hydrogen channel arrays 494 and 496. Referring to FIGS. 14, 18 and 19, a water permeable membrane 504 is disposed between the side 465 shown in FIG. 18 and the side 467 shown in FIG. 19 and facilitates the permeation of water from the water channel arrays 472, 474 and 476 into the hydrogen channel arrays 494 and 496 so that the hydrogen flowing in the hydrogen channel arrays becomes humidified. Thus, the hydrogen entering the hydrogen opening 486 is humidified.

Figure 20:
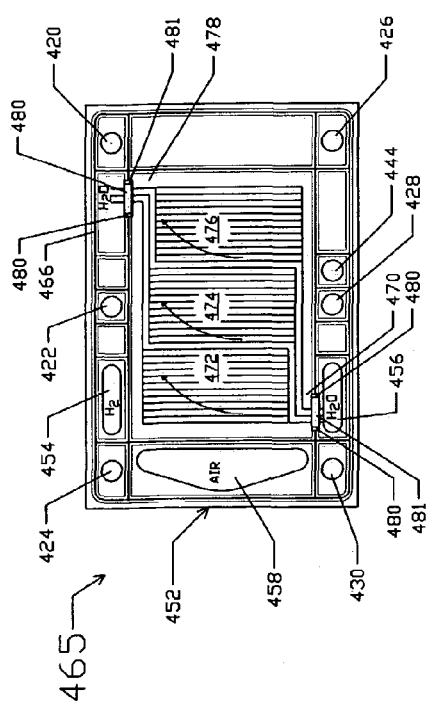
FIG. 20 is a plan view of an inwardly facing side of the second humidifier plate of FIG. 19.

Referring to FIG. 20, an inwardly facing side 505 of the second humidifier plate 482 is shown. This side 505 includes mounting openings 420 to 430 and further includes a groove arrangement shown generally at 506 which includes grooves surrounding each of the openings for receiving a seal (not shown) therein. In addition, the side 505 includes a plurality of inlet conduits shown generally at 508 which extend through the groove adjacent the water opening 484 and in communication therewith, for conducting water to a second set of transversely disposed water channel arrays 510, 512 and 514. The second set of water channel arrays 510, 512 and 514 are terminated in and are in communication with outlet conduits 516 which cross the groove portion adjacent the other water opening 480 and which are in communication therewith. Support surfaces 518 and 520 adjacent the conduits 508 and 516 are formed to support respective rectangular stainless steel bridge members 509 and 511 over the conduits 508 and 516, respectively for supporting corresponding portions of the seal.

Figure 21:
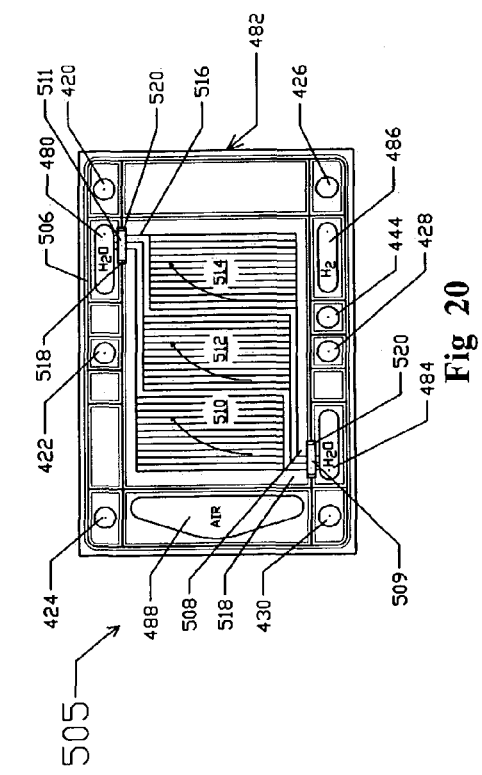
FIG. 21 is a plan view of an outwardly facing side of a third humidifier plate of the humidifier of the fuel cell apparatus shown in FIG. 1.

Referring to FIG. 21, an outwardly facing side 521 of a third humidifier plate 522 of the humidifier is shown. The third humidifier plate 522 includes the mounting openings 420 to 430 and further includes a water opening 524, a hydrogen opening 526 and a generally triangular air opening 528. The outwardly facing side 521 further includes a groove arrangement 530 comprising groove portions that extend to surround each opening in the plate and which is operable to receive a seal (not shown) therein. The outwardly facing side 521 of this third humidifier plate 522 includes a plurality of channels, one of which is shown at 531, extending lengthwise along the plate from an edge 532 of the air opening 528 and in communication therewith. The channels 531 are simply terminated as shown at 534 to cooperate with and to be placed in communication with the air opening 488 in the second humidifier plate seen best in FIG. 20. The channels 531 cross respective groove portions 536 and 538 and thus the groove portions are formed with supporting surfaces such as shown at 540 and 542 adjacent each of the channels 531, for supporting long stainless steel rectangular bridge members 541 and 543 operable to extend over all of the channels 531 to support corresponding portions of the seal (not shown) on opposite ends of the outwardly facing side 521.

Referring to FIGS. 14, 20 and 21 a water permeable membrane 550 is disposed between the inwardly facing side 505 of the second humidifier plate 482 as shown in FIG. 20 and the outwardly facing side 521 of the third humidifier plate 522 as shown in FIG. 21 so that water flowing in the second set of channel arrays 510, 512 and 514 as seen in FIG. 20 can pass through the water permeable membrane 550 to humidify air received in the end portions 534 of the channels 531. Thus, air exiting through opening 528 is humidified.

Referring to FIG. 22, an inwardly facing side 543 of the third humidifier plate 522 is shown and includes a generally flat planar surface with a groove arrangement 552 having groove portions which surround each of the openings in the plate. The inwardly facing side 543 of the third humidifier plate 522 shown in FIG. 22 is placed in contact with an outwardly facing side 545 of the current collector plate 410, shown in FIG. 23.

Referring to FIG. 23, the current collector plate 410 includes mounting openings 420 to 430 and further includes the first conductor 446 which is secured such as by a press fit or by threads, for example, to the plate 410. The plate 410 further includes a water opening 560, an air opening 562 and a hydrogen opening 564. The outwardly facing side 545 is smooth, flat planar to mate with the inwardly facing side 543 of the third humidifier plate 522 shown in FIG. 22 such that the seal in the groove arrangement 552 shown in FIG. 22 seals the openings between the plates 522 and 410 to prevent the escape of water, air or hydrogen therebetween.

Referring to FIG. 24, an inwardly facing side 547 of the current collector plate is a mirror image of the outwardly facing side 545 without the first conductor 446.

Referring to FIG. 25, an outwardly facing side 549 of the first water cooling plate 406 is shown. The first water cooling plate 406 includes the mounting openings 420 to 430 and further includes a water opening 570, an air opening 572 and a hydrogen opening 574. The outwardly facing side 549 further includes a groove arrangement 576 having groove portions that surround each of the openings in the plate 406 and which are operable to receive a seal (not shown) therein to seal the outwardly facing side 549 shown in FIG. 25 against the inwardly facing side 547 of the current collector plate 410 shown in FIG. 24.

Figure 26:
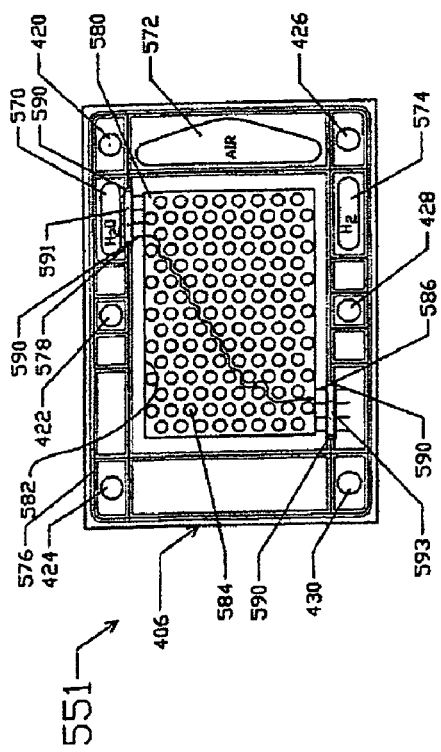
FIG. 26 is a plan view of an inwardly facing side of the first cooling plate shown in FIG. 25.

Referring to FIG. 26, an inwardly facing side 551 of the first cooling plate 406 is shown. The inwardly facing side 551 includes a groove arrangement 576 including groove portions which extend to surround each opening in the plate 406. The inwardly facing side 551 further includes a plurality of inlet conduits 578 which cross the groove portion adjacent the opening 570 and which extend into a recessed portion bounded by a recessed surface shown generally at 580, defined by a rectangular wall 582. Within the area bounded by the wall 582 there are a plurality of protrusions, one of which is shown at 584. The protrusions extend between 0.5 and 0.8 mm from the recessed surface 580 in an array of staggered rows and columns. A plurality of outlet conduits 586 is also in communication with the recessed area and the outlet conduits cross a groove portion to terminate adjacent a side of the plate 406. Support portions shown at 590 are disposed adjacent the groove portions that are crossed by the conduits 578 and 586 to support respective elongated rectangular stainless steel bridge members 591 and 593 for supporting corresponding portions of the seal.

Figure 27:
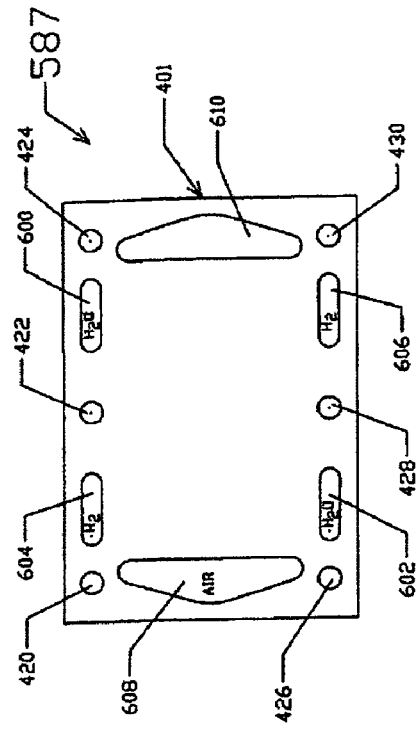
FIG. 27 is a plan view of an outwardly facing side of an anode fluid supply apparatus of the fuel cell shown in FIG. 14.

Referring to FIG. 27, an outwardly facing side 587 of the anode fluid supply apparatus 401 is shown. The anode fluid supply apparatus 401 is formed of a body in the form of a plate having mounting openings 420 to 430 and further including elongated hydrogen openings 600 and 602 disposed in approximately opposite corners of the plate and further including first and second water openings 604 and 606 also disposed in approximately opposite corners of the plate. The plate further includes first and second air openings 608 and 610 disposed at opposite ends thereof. In general, the outwardly facing side 587 is smooth, flat planar and is operable to mate with the inwardly facing side 551 of the cooling plate 406 shown in FIG. 26.

Figure 28:
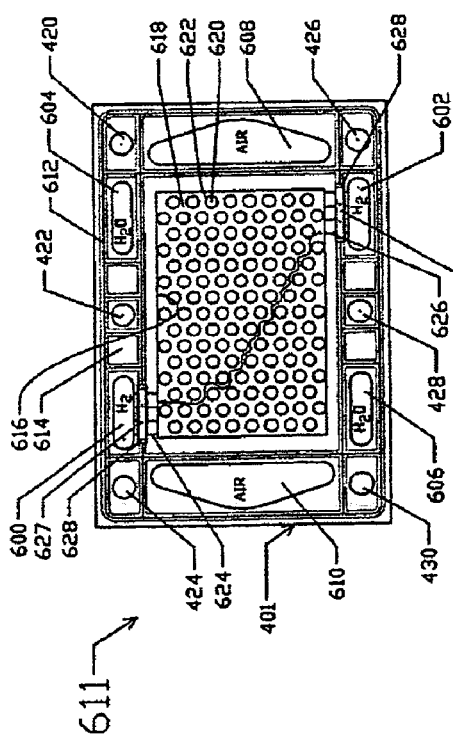
FIG. 28 is a plan view of an inwardly facing side of the anode fluid supply apparatus shown in FIG. 27.

Referring to FIG. 28, the inwardly facing side 611 of the anode fluid supply apparatus 401 is shown. This side 611 includes a groove arrangement 612 comprising groove portions that extend to surround each of the openings in the plate. The inwardly facing side 611 also has a generally flat face surface 614 and a wall 616 defining a first rectangular shaped recessed surface 618. A plurality of spaced apart protrusions which act as contacts 620 protrude from the recessed surface 618 such that portions of the recessed surface extend all around each of the contacts. Each contact 620 has a contact surface 622 spaced apart from the recessed surface 618 by about 0.5 to 0.8 mm and each contact surface lies generally in the same plane as the planar surface 614. The contacts 620 are arranged in rows and columns with adjacent columns being staggered so that fluid traveling between two adjacent contacts in a column is dispersed by a contact aligned between the two adjacent contacts in an adjacent column. Each contact 620 is spaced apart from an adjacent contact by the same common distance which may be about twice the diameter of a contact surface, for example, where the contact surfaces are circular. In this embodiment, each contact surface has a circular shape with a diameter of about $3/16$" but the contact surfaces may be generally curved shaped, rectangular, waffle shaped, or triangular, for example. Generally it is desirable that the total contact surface area is approximately equal to the total area between the contacts. The face is further formed with inlet conduits shown generally at 624 which extend between the recessed surface 618 and the hydrogen opening 600. These conduits 624 establish fluid communication between the opening 600 and the recessed surface 618.

This side 611 of the plate also has a plurality of outlet conduits 626 between the recessed surface 618 and the second hydrogen opening 602 to establish communication therebetween. Support surfaces 628, for example, are formed adjacent groove portions through which the inlet conduits 624 and outlet conduits 626 extend, to support elongated rectangular stainless steel bridge members 627 and 629 which are operable to support a corresponding portion of a seal (not shown) received in the groove arrangement 612. Referring to FIGS. 14 and 28 the inwardly facing side 611 shown in FIG. 28 is operable to face an anode layer 631 of the membrane assembly 405. Hydrogen supplied to the area between the contacts 620 from the opening 602 is operable to permeate the anode layer 627 for use in the fuel cell reaction.

Figure 29:
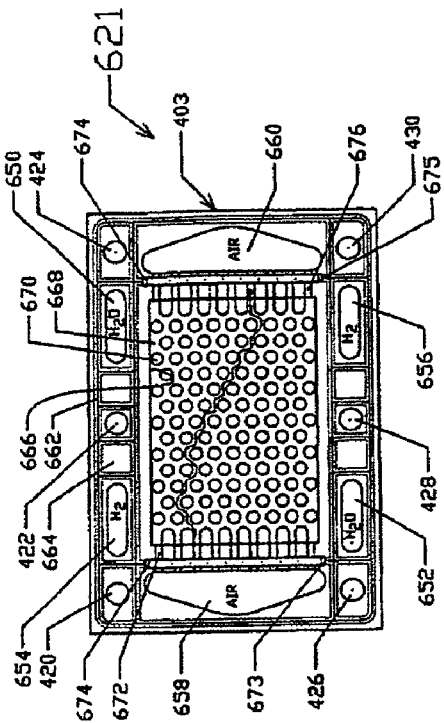
FIG. 29 is a plan view of an inwardly facing side of a cathode fluid supply apparatus of the fuel cell shown in FIG. 14.

Referring to FIG. 29, an inwardly facing side 621 of the cathode fluid supply apparatus 403 is shown. The cathode fluid supply apparatus 403 is formed of a body formed in a plate having the mounting openings 420 to 430 disposed therein and further including first and second elongated water openings 650 and 652, first and second hydrogen openings 654 and 656 and first and second air openings 658 and 660. The inwardly facing side 621 further includes a groove arrangement 662 comprising groove portions which surround each of the openings for holding a seal (not shown). In addition, the inwardly facing side 621 has a generally flat planar surface 664 and a wall 666 defining a rectangular recessed area 668 from which a plurality of contacts 670 similar to those shown in FIG. 28 protrude. The contacts 670 are arranged in the same pattern as seen in FIG. 28 and are of the same size and spacing, etc. Inlet conduits, one of which is shown at 672, for example, extend between the air opening 658 and the recessed surface 668. To do this, the conduits cross groove portions of the groove arrangement 662 adjacent the air opening 658. The face is formed with support portions 674 on opposite sides of each conduit 672 for supporting an elongated stainless steel rectangular member 673 over the conduits to support corresponding portions of the seal. The inwardly facing side 621 further includes outlet conduits, one of which is shown at 676, extending between the recessed surface and the air opening 660. Again, the side 621 is formed with support surfaces such as shown at 674 adjacent the outlet conduits 676 for supporting a second elongated rectangular stainless steel bridge member 675 for supporting a corresponding portion of the seal. Referring to FIGS. 14 and 29, the side 621 shown in FIG. 29 is received against a cathode layer 663 of the membrane assembly 405 and air received at the opening 658 is conducted via the inlet conduits 672 to the recessed surface 668 where it is distributed among the array of contacts 670 for dispersion into the cathode layer of the membrane assembly 405. Excess air is conducted through the outlet conduits 676 into the air outlet opening 660.

This face side configuration is particularly useful on the cathode side of the fuel cell where the fluid received in the inlet opening is air, since the oxygen content per unit volume of air is much less than 100% as is achievable when pure oxygen is used, as in the first embodiment. In this embodiment, air at a pressure of 5-30 psi and a flow rate of about 7 ml/minute/ampere/cell may be used to support the reaction at the fuel cell and will flush out water received in the dispersion area from the cathode gas diffusion layer.

As a result of the flushing of water facilitated by the recessed surface 668 and contact arrangement described herein, there is a good exchange of air through the dispersion area, which helps to flush nitrogen in the air through the dispersion area reducing its transit time therethrough and reducing the effects of nitrogen reacting with the cathode gas diffusion layer 663.

Referring to FIG. 30, an outwardly facing side 671 of the cathode fluid supply apparatus 403 includes a flat face formed with a groove arrangement 680 including groove portions which extend to surround each of the openings and which hold a seal (not shown). This side 671 is further formed with a wall 682 defining a recessed surface 684 from which a plurality of protrusions 686 extend by a distance of approximately 0.5 to 0.8 mm to form an array. A plurality of inlet conduits 690 are formed to extend between the water opening 650 and the recessed surface 684 and outlet conduits 692 are formed to extend between the recessed surface and the water opening 652. Support surfaces such as shown at 694 are formed in groove portions adjacent the openings 650 and 652 to support respective bridge members 651 and 653 for supporting corresponding portions of the seal over the inlet and outlet conduits 690 and 692. The outwardly facing side 671 the cathode fluid supply apparatus 403 abuts an inwardly facing side of the second cooling plate 408, as shown at 699 in FIG. 31. The second cooling plate 408 includes the mounting openings 420 to 430 and further includes a hydrogen opening 700, an air opening 702 and a water opening 704. In general, the inwardly facing side 699 is flat planar.

Referring to FIG. 32, an outwardly facing side of the second cooling plate 408 is shown generally at 705 and includes a groove arrangement as shown at 710 for receiving a seal (not shown). The outwardly facing side 705 abuts an inwardly facing side 711 of the second current collector plate 412 as shown in FIG. 33. The second current collector plate 412 includes the mounting openings 420 to 430 and further includes a hydrogen opening 712, an air opening 714 and a water opening 716. In general the inwardly facing side is flat planar.

Referring to FIG. 34, an outwardly facing side 717 of the second current collector plate 412 is shown. This outwardly facing side is a mirror image of the inwardly facing side shown in FIG. 33 with the exception that it includes a second conductor 720 extending at right angles from the smooth flat planer face of the outwardly facing side 717 of the second current collector plate 412.

Referring to FIG. 35, an inwardly facing side 721 of the second end plate 416 is shown. The second end plate has mounting openings 420 to 430 and further includes a conduit opening 726 for receiving the second conduit 720 shown in FIG. 34, a hydrogen exhaust opening 728, an air exhaust opening 730, and a water exhaust opening 732 as shown. Otherwise, the inwardly facing side 721 is smooth flat planar.

Referring to FIG. 36, an outwardly facing side 733 of the second end plate 416 is shown. This side 733 includes a hydrogen exhaust connector 738 in communication with the hydrogen exhaust opening 728, an air exhaust connector 740 in communication with the air exhaust opening 730 and a water exhaust connector 742 in communication with the water exhaust opening 732. It will be appreciated that the conductor 720 shown in FIG. 34 will extend through the opening 726 out of the plane of the page, toward the reader.

Operation of the fuel cell according to this fourth embodiment shown in FIGS. 14 to 36 will now be described.

Referring to FIGS. 14 and 15, hydrogen received at the hydrogen supply connector 438 is received through the hydrogen opening 432 shown in FIGS. 15 and 16 and is transmitted through the hydrogen opening 454 shown in FIGS. 17 and 18 and is received in the conduits 492 in the outwardly facing side 467 of the second cooling plate 482 shown in FIG. 19. The hydrogen flows through the hydrogen channel arrays 494 and 496 and is collected by conduits 498 and channeled into the hydrogen opening 486.

Referring to FIGS. 20 and 21, hydrogen in the hydrogen opening 486 is communicated to the hydrogen opening 526 in the third cooling plate 522 and referring to FIGS. 22 and 23, is further conducted through the hydrogen opening 564 in the current collector plate 410 shown in FIG. 23.

Referring to FIGS. 24 and 25, hydrogen in the hydrogen opening 564 is communicated to the hydrogen opening 574 in the third cooling plate shown in FIGS. 25 and 26 and is further conducted into the hydrogen opening 602 in the anode fluid distribution plate 401 shown in FIGS. 27 and 28. Hydrogen received in the opening 602 is communicated through conduits 626 to the recessed area 618 where it is dispersed among the contacts 620 for dispersion into the anode gas diffusion layer 631 of the membrane assembly 405. Excess hydrogen is conducted through the outlet conduits 624 to the hydrogen opening 600 where it is communication through an opening (not shown) in the membrane assembly to the hydrogen exhaust opening 654 in the second fluid supply apparatus 403 shown in FIGS. 29 and 30. Hydrogen in the hydrogen exhaust opening 654 is communicated to the hydrogen exhaust opening 700 in the second cooling plate 408 shown in FIGS. 31 and 32 and is further communicated into the hydrogen exhaust opening 712 in the second current collector plate 412 shown in FIGS. 33 and 34. Hydrogen in the hydrogen exhaust opening 712 is further communicated to the hydrogen exhaust opening 728 in the second end plate 416 shown in FIGS. 35 and 36 where it is operable to exit the fuel cell through the hydrogen exhaust connector 738 shown in FIG. 36.

Referring back to FIGS. 14 and 15, air received at the air inlet connector 440 is communicated to the air supply opening 434 in the first end plate 414 shown in FIGS. 15 and 16. Air received in the air supply opening 434 is communicated to the air opening 458 in the first humidifier plate 452 shown in FIGS. 17 and 18 and is further communicated to the air opening 488 in the second humidifier plate 482 shown in FIGS. 19 and 20. Air in the air opening 488 is further communicated to the air channel terminations 534 in the third humidifier plate shown in FIG. 21. Air received in these channel terminations is conducted by the channels 531 in a direction from right to left across the page toward the air exhaust opening 528 in the third humidifier plate 522 shown in FIG. 21. Air received in the air exhaust opening 528 is communicated to the air exhaust opening 562 in the first current collector plate 410 shown in FIGS. 23 and 24 and is further communicated to the air exhaust opening 572 in the third cooling plate 406 shown in FIGS. 25 and 26. The air is further communicated into the air supply opening 608 of the first fluid supply apparatus 401 shown in FIGS. 27 and 28 and is further communicated to the air supply opening 658 of the second fluid supply apparatus shown in FIGS. 29 and 30. Air received in the air supply opening 658 is communicated through the inlet conduits 672 into the dispersion area among the contacts 670 where it is operable to diffuse into the cathode gas diffusion layer 663 of the membrane assembly.

Water received from the cathode gas diffusion layer as a result of the fuel cell reaction or as a result of hydrogen dragging water through the membrane, is exhausted through the outlet conduits 676 and gathered at the air exhaust opening 660. Air gathered at the air exhaust opening 660 is communicated to the air exhaust opening 702 in the second cooling plate 408 shown in FIGS. 31 and 32 and is further communicated through the air exhaust opening 714 in the second current collector plate 412 shown in FIGS. 33 and 34 and is received at the air opening 730 in the second end plate shown in FIGS. 35 and 36. Air received at the air exhaust opening 730 is exhausted from the fuel cell through the air exhaust connector 740 shown in FIG. 36.

Referring back to FIGS. 14 and 15, water received at the water supply connector 442 is communicated to the water supply opening 436 in the first end plate 414 shown in FIGS. 15 and 16. From the water supply opening 436, the water is communicated through the water supply opening 456 in the first cooling plate 452 shown in FIGS. 17 and 18. Water received in the water supply opening 456 is communicated via the conduits 470 through the water channel arrays 472, 474 and 476 and is communicated via the outlet conduits 478 to a water supply opening 480 in the second humidifier plate 482 shown in FIGS. 19 and 20. At the same time, water in the water supply opening 456 is communicated to the water supply opening 484 in the second humidifier plate 482 shown in FIGS. 19 and 20 and is channeled by inlet conduits 508 through the second set of water channel arrays 510, 512 and 514 to be captured by the outlet conduits 516 and communicated to the water supply opening 480.

As described above, water flowing through the water channel arrays 472, 474 and 476 is operable to pass through the water permeable membrane between faces 465 shown in FIGS. 18 and 467 shown in FIG. 19 to cause hydrogen flowing through the channel arrays 494 and 496 in the second humidifier plate 482 shown in FIG. 19 to be humidified. Similarly, water flowing in the second set of water channel arrays 510, 512 and 514 is operable to pass through a second water permeable membrane between the face 505 of the second cooling plate 482 shown in FIG. 20 and face 521 of the third cooling plate 522 shown in FIG. 21 to permit air flowing in the channels 531 to become humidified such that air received in the air supply opening 528 is humidified air.

Returning to the description of the flow of water through the fuel cell, water received in the water supply opening 480 passes through the water supply opening 524 in the third humidifier plate 522 shown in FIGS. 21 and 22 and is further conducted into the water supply opening 560 in the current collector plate 410 shown in FIGS. 23 and 24. Water received in the opening 560 is communicated to the water supply opening 570 in the first cooling plate 406 shown in FIGS. 25 and 26.

Referring to FIG. 26, water received in the water supply opening 570 is conducted by inlet conduits 578 to the array of protrusions 584 where it is dispersed among the protrusions to extract heat therefrom. The water is received by the outlet conduits 586 and is communicated to the water exhaust opening 606 in the first fluid supply apparatus 401 shown in FIGS. 27 and 28. At the same time, a portion of the water received in the opening 570 in the first cooling plate 406 shown in FIG. 26 is communicated to the water supply opening 604 in the first fluid supply apparatus 401 shown in FIGS. 27 and 28. Water in the openings 604 and 606 is communicated through corresponding openings in the membrane (not shown) and further through corresponding openings 650 and 652, respectively, in the second fluid supply apparatus 403 shown in FIGS. 29 and 30.

Referring to FIG. 30, water received in the opening 650 is communicated via inlet conduits 690 into the dispersion area among the protrusions 686 and is received at outlet conduits 692 and communicated to the second water opening 652. Water received at the second water opening 652 is communicated through the water exhaust opening 704 in the second cooling plate 408 shown in FIGS. 31 and 32. Water in the water exhaust opening 704 is communicated through the water exhaust opening 716 in the second current collector plate 412 shown in FIGS. 33 and 34 and is further communicated to the water exhaust opening 732 in the end plate shown in FIGS. 35 and 36.

Referring to FIG. 36, water received in the water exhaust opening 732 is exhausted from the fuel cell through the water exhaust connector 742.

Figure 37:
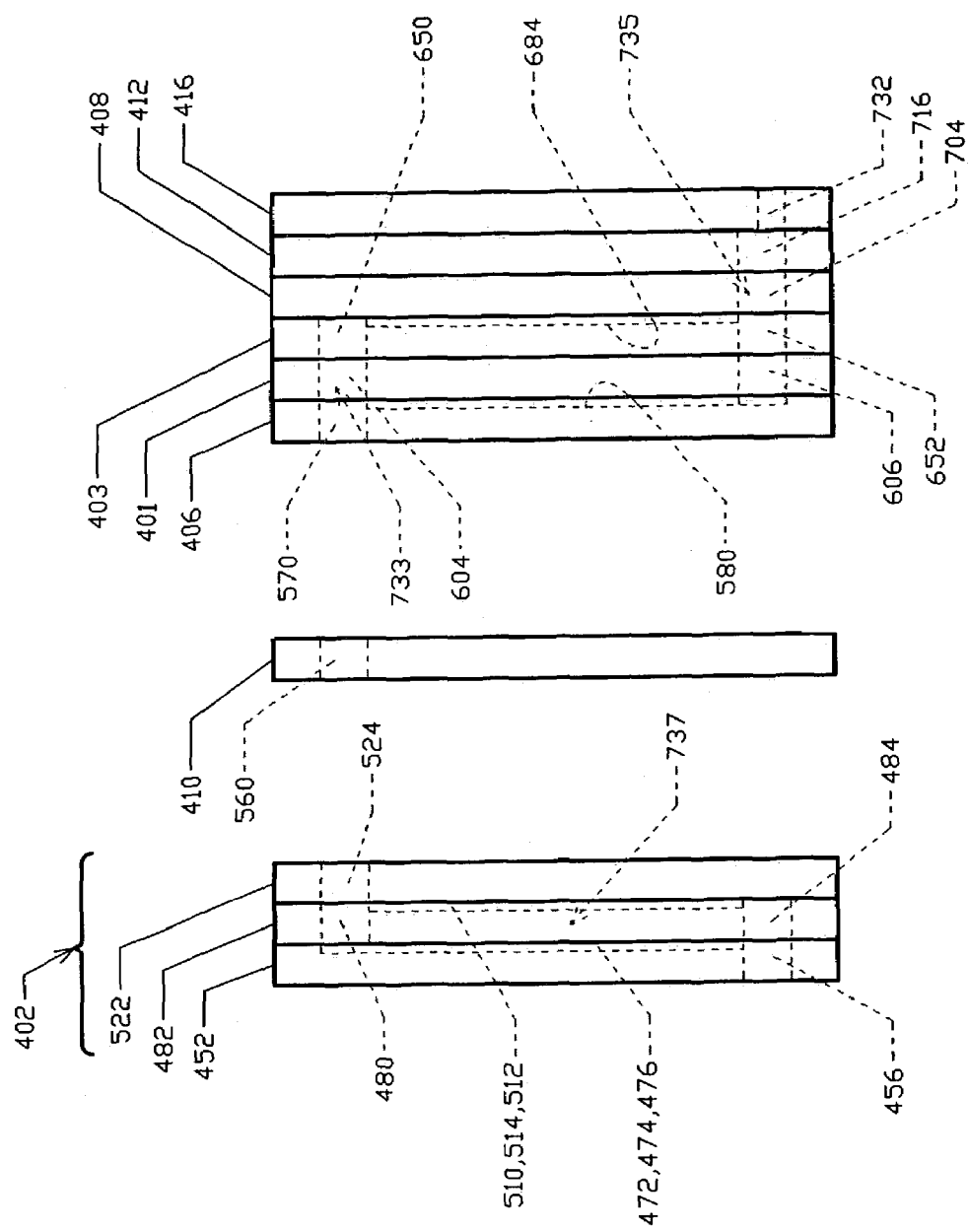
FIG. 37 is a top view of the humidifier and fuel cell shown in FIG. 14 illustrating water humidification and cooling passages.

Referring to FIG. 37, from the foregoing it will be appreciated that the openings 570, 604 and 650 in components 406, 401 and 403 act as a first portion 733 of a passageway for the conduction of cooling water through the fuel cell. In addition openings 606, 652, 704, 716 and 732 act as a second portion 735 of the passageway. The recessed surfaces 580 and 684 in components 406 and 403 also act as part of the passageway by communicating water from the first portion 733 to the second portion 735 of the passageway. Cooling water is supplied to the first portion 733 of the passageway through the opening 560 in the plate 410 interposed between the humidifier 402 and the fuel cell.

The opening 456 in humidifier plate 452 acts as a water inlet, and the arrays 472, 474, 476 and 510, 512, 514 in the first and second humidifier plates 452 and 482 respectively act as a water disperser 737 operable to cause at least some of the water received at the water inlet to be absorbed into at least one reactant of the fuel cell. Opening 524 acts as a water outlet operable to receive unabsorbed water from the water disperser and is in communication with the first portion 733 of the cooling passageway in the fuel cell (via the plate 410 in this embodiment) to direct the unabsorbed water to the cooling passageway for use in cooling the fuel cell. Thus, a single water supply may be provided to the humidifier 402 and excess, unabsorbed water in the humidifier is directed into the fuel cell for use in cooling the fuel cell. A suitable flow rate of water may be supplied to the humidifier to ensure that sufficient water is provided to the fuel cell for cooling.

Figure 38:
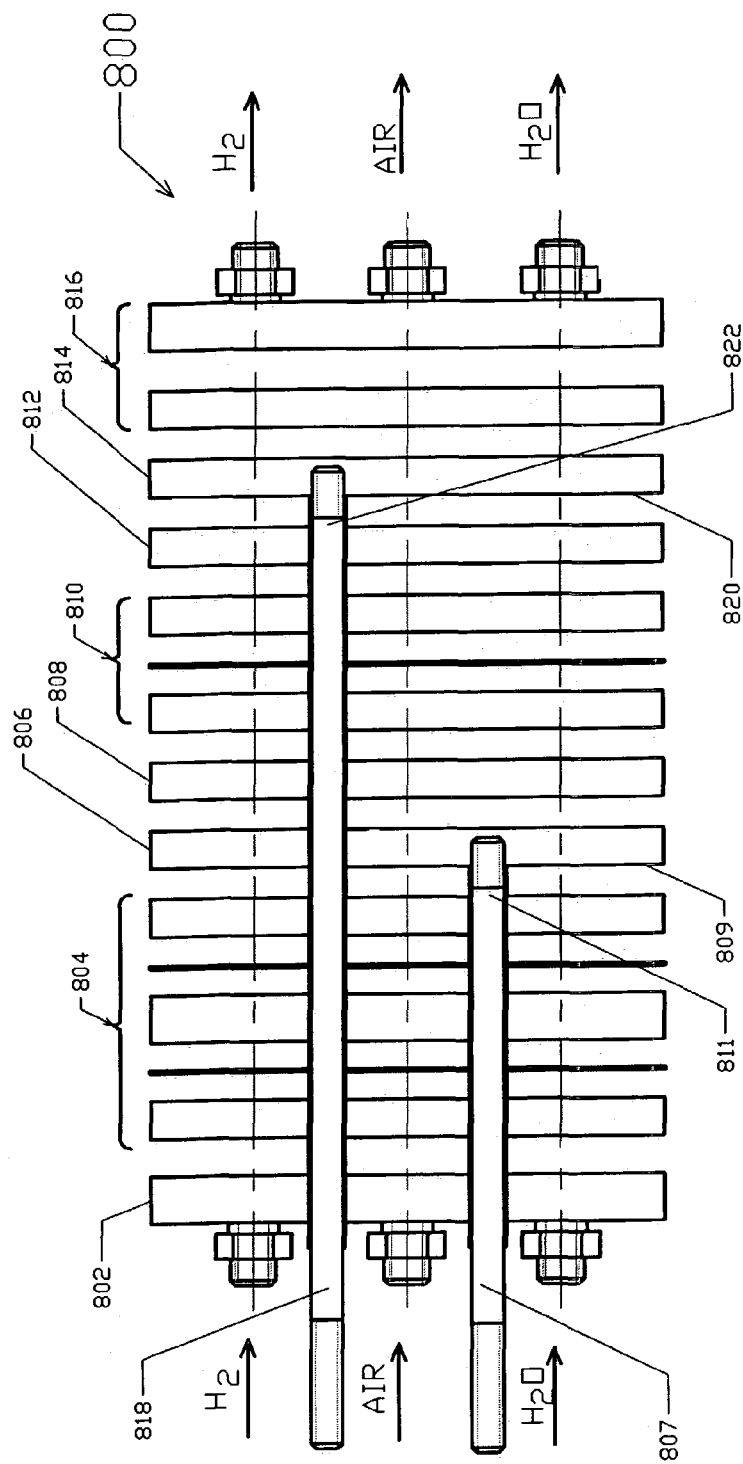
FIG. 38 is an exploded view of a fuel cell apparatus according to a fourth embodiment of the invention in which circuit termination conduits protrude from a first end of the fuel cell apparatus.

Referring to FIG. 38, a fuel cell according to an alternative embodiment of the invention is shown generally at 800. The fuel cell of this arrangement is similar to the fuel cell shown in FIG. 14 with the exception that it includes a second current collector plate 814 having a conductor 818 connected to an inwardly facing side 820 thereof so that the conductor 818 extends on the same end of the fuel cell as a conductor 807 connected to the first current collector plate 806.

In this embodiment, the fuel cell is comprised of a first end plate 802, a humidifier section 804, a first current collector plate 806, a cooling plate 808, a fuel cell module 810, the second cooling plate 812, a second current collector plate 814 and an end plate 816. The first current collector plate 806 has a first conductor 807 secured thereto to extend from an outwardly facing side 809 thereof. The end plate 802 and the humidifier components 804 have respective openings which are aligned to permit the conductor 807 to extend therethrough. An insulator 811 is placed over the conductor 807 to insulate it from the first end plate 802 and the humidifier components 804. The first end plate 802, all components of the humidifier 804, the first current collector plate 806, the first cooling plate 808, the fuel cell module 810 and the second cooling plate 812 also each have respective openings therethrough which are aligned to receive the second conductor 818 therethrough. An insulator 822 is placed over the second conductor 818 to insulate it from the respective components 802, 804, 806, 808, 810 and 812.

The conductors 807 and 818 extend or protrude from a same end of the fuel cell 800 and facilitate easy connection of electrical components to the conductors from the same end of the fuel cell. It will be appreciated that by suitable reversal of the conductors 807 and 818 to extend in opposite directions from their respective plates and by adjusting the lengths of these conductors appropriately and by forming openings in appropriate intervening components, the conductors 807 and 818 may be caused to extend from the opposite end of the fuel cell.

Figure 39:
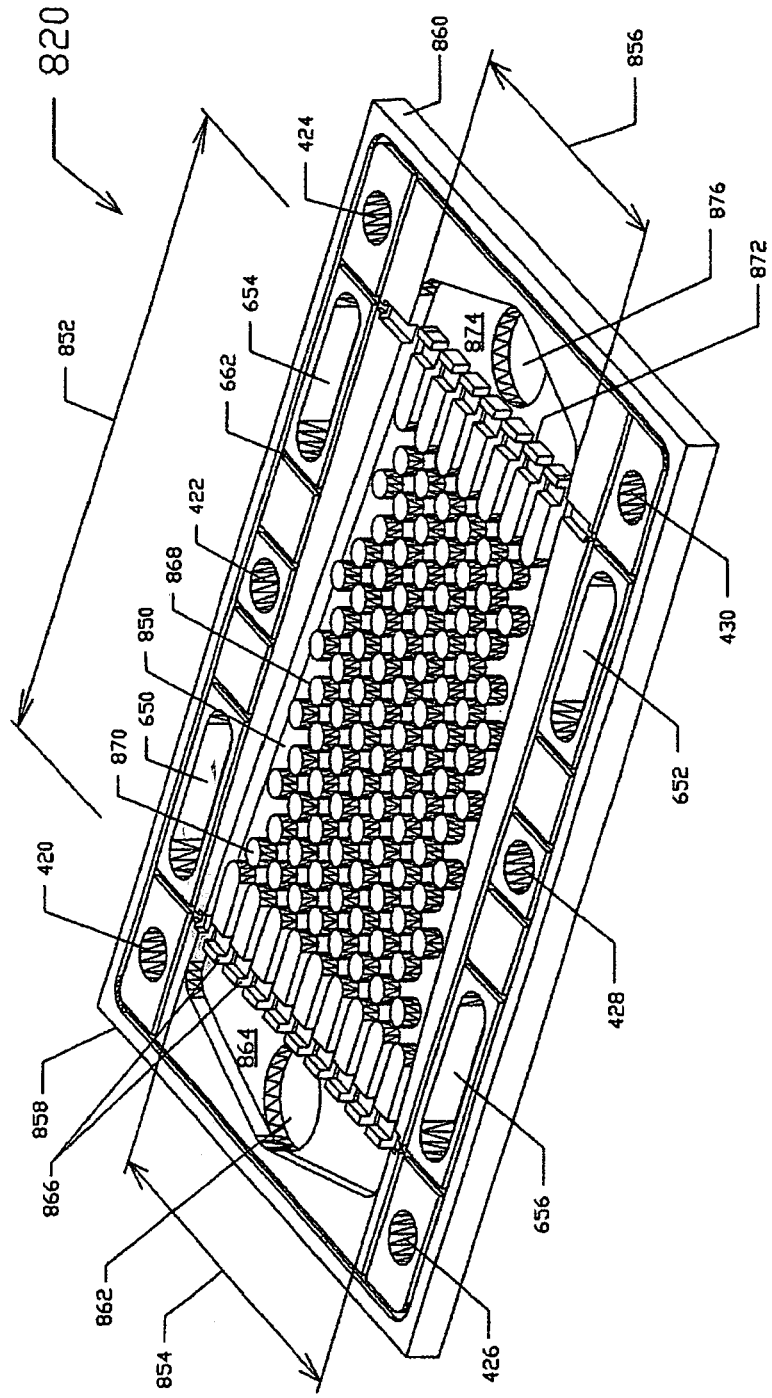
FIG. 39 is a perspective view of an alternate configuration of an inwardly facing side of the cathode reactant supply apparatus replacing the one shown in FIG. 29.

Referring to FIGS. 29 and 39, the face configuration of the second fluid supply apparatus 403 shown in FIG. 29 may alternatively be replaced with the face configuration shown in FIG. 39. In this replacement configuration, a second fluid supply apparatus 820 has mounting openings 420, 422, 424, 426, 428 and 430 and further has water openings 650, 652 and hydrogen openings 654 and 656 similar to those shown in FIG. 29. In addition, the apparatus 820 includes a groove arrangement 662 generally the same as that shown in FIG. 29, for holding a seal therein.

In this embodiment, the apparatus 820 further includes a recessed surface 850 having a generally trapezium shape defined by a length indicated by arrow 852, a first width indicated by arrow 854 and a second width indicated by arrow 856. The second width 856 is less than the first width 854 and continually decreases from an inlet end 858 of the apparatus 820 to an outlet end 860 thereof. In this embodiment, air entering an inlet opening 862 in the apparatus is directed by an adjacent recessed surface 864 into a plurality of inlet channels 866 for distribution into a dispersion area 868 where the air is dispersed among an array of contacts 870. The decreasing width of the recessed surface 850 helps to maintain a relatively constant pressure of air throughout the dispersion area 868 and excess air and water formed by the fuel cell reaction and water dragged through the membrane assembly is channeled through outlet conduits, one of which is shown at 872, into an outlet recessed surface 874 which acts as a receiving area to collect and channel air and water toward an outlet opening 876.

From the foregoing, it will be appreciated that a dispersion area according to the invention described herein may be used to disperse hydrogen, air, oxygen and/or water on various faces of components of a fuel cell to perform fluid distribution functions and to collect fluid for exhaust from the fuel cell to prevent flooding. In addition, various air and water cooling methods and apparatus have been described and useful circuit termination configurations are described.

While specific embodiments of the invention have been described and illustrated, such embodiments should be considered illustrative of the invention only and not as limiting the invention as construed in accordance with the accompanying claims.

What is claimed is:

1. An apparatus for conducting fluid in a fuel cell, the apparatus comprising
   a unitary gas-impermeable body having.
   a face having a recessed surface and a wall extending around said recessed surface, said recessed surface and said wall defining a fluid dispersion area;
   a plurality of spaced apart protrusions protruding from said recessed surface in said fluid dispersion area such that portions of said recessed surface extend all around each of said protrusions, each protrusion having a protrusion surface spaced apart from said recessed surface, wherein said plurality of spaced apart protrusions are arranged in rows and columns, and wherein alternate columns of protrusions are staggered relative to adjacent columns;
   an inlet opening, a first plurality of inlet conduits, and a distribution area between said inlet opening and said first plurality of conduits for distributing fluid to said first plurality of conduits for communication to said fluid dispersion area; and
   an outlet opening and an outlet conduit, said outlet conduit being in communication with said fluid dispersion area and said outlet opening to facilitate communication of fluid between said fluid dispersion area and said outlet opening.

2. The apparatus of claim 1 wherein said recessed surface is generally planar.

3. The apparatus of claim 2 wherein said recessed surface has a generally rectangular shape.

4. The apparatus of claim 2 wherein said recessed surface has a generally trapezium shape.

5. The apparatus of claim 2 wherein said recessed surface has a length and a width, said width decreasing from a first width adjacent said inlet opening to a second width adjacent said outlet opening.

6. The apparatus of claim 1 wherein said body includes a plate.

7. The apparatus of claim 1 wherein said recessed surface has a length and a width, said width decreasing from a first width adjacent said inlet opening to a second width adjacent said outlet opening.

8. The apparatus of claim 1 wherein said outlet conduit comprises a second plurality of conduits and wherein said body further comprises a receiving area between said second plurality of conduits and said outlet opening for receiving fluid from said second plurality of conduits for exhaust through said outlet opening.

9. The apparatus of claim 1 wherein said body is formed from a castable electrically-conductive corrosion-resistant material.

10. The apparatus of claim 1 wherein said body is formed from graphite material.

11. The apparatus of claim 1 wherein said body is formed from a metal, said metal being coated with at least one of graphite powder, titanium, and gold.

12. The apparatus of claim 1 wherein said body is formed from a composite material.

13. The apparatus of claim 1 wherein said body is formed from a composite material, said composite material being coated with at least one of graphite powder, titanium, and gold.

14. The apparatus of claim 1 wherein each said protrusion surface has a generally curved shape.

15. The apparatus of claim 1 wherein each said protrusion surface has at least one of a rectangular, circular and triangular shape.

16. The apparatus of claim 1 wherein each said protrusion surface lies in a common plane.

17. The apparatus of claim 1 wherein said recessed surface has a total recessed surface area and wherein each said protrusion surface has a respective surface area and wherein a sum of said respective surface areas is approximately equal to said total recessed surface area.

18. The apparatus of claim 1 wherein each said protrusion is spaced apart from adjacent protrusions by a common distance.

19. The apparatus of claim 1 wherein said protrusion surface is disposed approximately 0.5 mm to 0.8 mm from said recessed surface.

20. The apparatus of claim 1 wherein said body has a groove extending around said recessed surface, for receiving a seal for sealing said face to an adjacent component in the fuel cell.

21. The apparatus of claim 20 further comprising a first bridge member and wherein said face has a first support surface adjacent said inlet conduit for supporting said first bridge member over said inlet conduit.

22. The apparatus of claim 21 further comprising a second bridge member and wherein said face has a second support surface adjacent said outlet conduit for supporting said second bridge member over said outlet conduit.

23. The apparatus of claim 21 wherein said groove further comprises groove portions adjacent said first support surface, said seal including an inner portion operable to lie in said groove portions and wherein said first bridge member is operable to support said inner portion.

24. The apparatus of claim 1 wherein said body includes a plate, said face being on said plate and being generally flat.

25. The apparatus of claim 24 wherein said plate includes cooling means for cooling said plate, on a side of said plate opposite said face.

26. The apparatus of claim 25 wherein said cooling means includes parallel spaced apart grooves formed in said plate.

27. The apparatus of claim 25 wherein said protrusions are formed in an array, said array defining an active area of said plate and wherein said cooling means is disposed opposite said active area.

28. The apparatus of claim 26 wherein said body has an inwardly facing side and an outwardly facing side, said recessed surface being formed in said inwardly facing side, said inwardly facing side being operable to contact a gas diffusion layer of a membrane of said fuel cell and said grooves being formed in said outwardly facing side to facilitate cooling.

29. The apparatus of claim 25 wherein said body has an inwardly facing side and an outwardly facing side, said recessed surface being formed in said inwardly facing side, said inwardly facing side being operable to contact a gas diffusion layer of a membrane assembly of said fuel cell and wherein said cooling means is formed in said outwardly facing side and comprises:
a second recessed surface and a second wall extending around said second recessed surface, said second recessed
surface and said second wall defining a second fluid dispersion area;
a second plurality of spaced apart protrusions protruding from said second recessed surface in said second fluid dispersion area such that portions of said second recessed surface extend all around each of said protrusions, each protrusion having a protrusion surface spaced apart from said second recessed surface; and
a second inlet opening operable to receive cooling fluid, a second inlet conduit, a second outlet opening and a second outlet conduit, said second inlet conduit being in communication with said second inlet opening and said second fluid dispersion area to facilitate communication of cooling fluid from said second inlet opening to said second fluid dispersion area and said second outlet conduit being in communication with said second fluid dispersion area and said second outlet opening to facilitate communication of said cooling fluid between said second fluid dispersion area and said second outlet opening.

30. The apparatus of claim 24 further comprising openings extending through said plate, adjacent said recessed surface, for receiving mounting devices therethrough, for mounting said plate in the fuel cell.

31. The apparatus of claim 1 further comprising an electrical conduit mount for mounting a first electrical conduit to said body such that said first electrical conduit extends generally perpendicular to said face of said body.

32. The apparatus of claim 31 further comprising a first electrical conduit connected to said electrical conduit mount, said first electrical conduit having a first circuit termination portion.

33. The apparatus of claim 32 further comprising an insulator on said first electrical conduit.

34. The apparatus of claim 1 further comprising mounting openings in said body for mounting said body to the fuel cell.

35. The apparatus of claim 1 further comprising a conduit opening in said body for receiving a conduit operable to conduct electrical power from said fuel cell.

36. A fuel cell stack apparatus comprising.
a first fuel cell membrane assembly having a proton exchange membrane and anode and cathode gas diffusion layers on opposite sides of said proton exchange membrane;
a first fluid supply apparatus comprising a gas impermeable body having a first inwardly facing side and a first outwardly facing side, said first inwardly facing side being in contact with said anode gas diffusion layer and having:
a first recessed surface and a first wall extending around said first recessed surface, said first recessed surface and said first wall defining a first fluid dispersion area;
a first plurality of spaced apart protrusions protruding from said recessed surface in said first fluid dispersion area such that portions of said recessed surface extend all around each of said protrusions, each protrusion having a protrusion surface spaced apart from said recessed surface, said protrusion surfaces being operable to contact said anode gas diffusion layer, wherein said plurality of spaced apart protrusions are arranged in rows and columns, and wherein alternate columns of protrusions are staggered relative to adjacent columns;

a first inlet opening for receiving anode reactant fluid, first plurality of inlet conduits, and a first distribution area between said first inlet opening and said first plurality of inlet conduits for distributing anode reactant fluid to said first plurality of inlet conduits for communication of said anode reactant fluid to said first fluid dispersion area, a first outlet opening and first outlet conduit, said first outlet conduit being in communication with said first fluid dispersion area and said first outlet opening to facilitate communication of anode reactant fluid between said first. fluid dispersion area and said first outlet opening; and a second fluid supply apparatus comprising a unitary gas-impermeable body having:

a second inwardly facing side and a second outwardly facing side, said second inwardly facing side being in contact with said cathode gas diffusion layer and having a second recessed surface and a second wall extending around said second recessed surface, said second recessed surface and said second wall defining a second fluid dispersion area;

a second plurality of spaced apart protrusions protruding from said second recessed surface such that portions of said second recessed surface extend all around each of said protrusions, each protrusion having a protrusion surface spaced apart from said second recessed surface, wherein said plurality of spaced apart protrusions are arranged in rows and columns, and wherein alternate columns of protrusions are staggered relative to adjacent columns;

a second inlet opening operable to receive cathode reactant fluid, second plurality of inlet conduits, and a second distribution area between said second inlet opening and said second plurality of inlet conduits for distributing cathode reactant fluid to said second plurality of inlet conduits for communication of said cathode reactant fluid to said second fluid dispersion area; and a second outlet opening and second outlet conduit, said second outlet conduit being in communication with said second fluid dispersion area and said second outlet opening to facilitate communication of excess cathode reactant fluid and water from said cathode gas diffusion layer from said second fluid dispersion area to said second outlet opening.

37. The apparatus of claim 36 wherein said second outwardly facing side of said second fluid supply apparatus comprises cooling means for cooling said second fluid supply apparatus.

38. The apparatus of claim 37 wherein said cooling means comprises.

a third face on said second fluid supply apparatus, said third face having a third recessed surface and a third wall extending around said third recessed surface, said third recessed surface and said third wall defining a third fluid dispersion area;

a third plurality of spaced apart protrusions protruding from said third recessed surface in said third fluid dispersion area such that portions of said third recessed surface extend all around each of said protrusions, each protrusion having a protrusion surface spaced apart from said recessed surface; and a third inlet opening for receiving cooling fluid, a third inlet conduit, a third outlet opening for draining cooling fluid and a third outlet conduit, said third inlet conduit being in communication with said third inlet opening and said fluid dispersion area to facilitate communication of cooling fluid from said third inlet opening to said third fluid dispersion area and said third outlet conduit being in communication with said third fluid dispersion area and said third outlet opening to facilitate communication of cooling fluid between said third fluid dispersion area and said third outlet opening.

39. The apparatus of claim 37 wherein said cooling means comprises a plurality of parallel grooves in said outwardly facing side of said second fluid supply apparatus said groves being operable to conduct cooling fluid to facilitate cooling of said second fluid supply apparatus.

40. The apparatus of claim 36 further comprising:

first and second current collector plates in contact with said first and second fluid supply apparatuses respectively, each of said first and second current collector plates having an inwardly facing side and an outwardly facing side;

first and second electrical conduits respectively secured to at least one of said inwardly and outwardly facing sides of said first and second current collector plates respectively;

first and second insulators on said first and second conduits respectively;

said first and second conduits being secured to said first and second current collector plates such that said first and second conduits extend through openings in components of the fuel cell and are insulated from said components by said first and second insulators, such that said first and second conduits extend from a same end of said fuel cell.

* * * * *